(12) United States Patent
Swan

(10) Patent No.: US 10,756,560 B2
(45) Date of Patent: Aug. 25, 2020

(54) WIRELESS POWER TRANSMISSION RECEIVING DEVICE STATE MODIFICATION

(71) Applicant: Ossia Inc., Bellevue, WA (US)

(72) Inventor: Philip L. Swan, Redmond, WA (US)

(73) Assignee: OSSIA INC., Bellevue, WA (US)

( * ) Notice: Subject to any disclaimer, the term of this patent is extended or adjusted under 35 U.S.C. 154(b) by 154 days.

(21) Appl. No.: 15/978,046

(22) Filed: May 11, 2018

(65) Prior Publication Data

US 2019/0348853 A1    Nov. 14, 2019

(51) Int. Cl.
*H02J 7/02* (2016.01)
*H02J 50/80* (2016.01)
*H02J 50/10* (2016.01)
*H02J 50/05* (2016.01)

(52) U.S. Cl.
CPC ............. *H02J 7/025* (2013.01); *H02J 50/05* (2016.02); *H02J 50/10* (2016.02); *H02J 50/80* (2016.02)

(58) Field of Classification Search
CPC ........................................ H02J 7/025
USPC ........................................... 320/108
See application file for complete search history.

(56) References Cited

U.S. PATENT DOCUMENTS

| | | | | |
|---|---|---|---|---|
| 9,552,721 B2* | 1/2017 | Feng | ........................ | G08C 17/02 |
| 9,806,554 B2* | 10/2017 | Lee | ........................ | H02J 50/60 |
| 2004/0097254 A1* | 5/2004 | Laroia | ................... | H04W 16/12 |
| | | | | 455/522 |
| 2014/0113689 A1* | 4/2014 | Lee | ................... | H04W 52/0277 |
| | | | | 455/573 |
| 2017/0269668 A1* | 9/2017 | Min | ...................... | G06F 1/3296 |

* cited by examiner

*Primary Examiner* — Jerry D Robbins
(74) *Attorney, Agent, or Firm* — Amin, Turocy & Watson, LLP

(57) ABSTRACT

Modification of a state of a wireless power receiving device is disclosed. The modification of the state can be based on anticipated delay in a communication session. In an aspect, this can include a delay related to authenticating the wireless power receiving device to a wireless power transmission system or component thereof. In an aspect, this can provide for better control over which wireless power receiving devices have wireless power directed at them, which can be related to safety, reliability, subscription level, or other best practices. In some embodiments, wireless power receiving devices can receive a first level of wireless power in a current state, in a modified state, etc., while a second level of power can be directed to the wireless power receiving device upon a rule related to anticipated delay being satisfied, e.g., upon authentication, upon expiration of a sleep timer, determined subscription status, etc.

20 Claims, 15 Drawing Sheets

WIRELESS POWER TRANSMISSION RECEIVING DEVICE STATE MODIFICATION

TECHNICAL FIELD

The disclosed subject matter relates to wireless power transmission. For instance, a state of a device for receiving a wireless power transmission can be adapted, e.g., to reduce power consumption of the receiving device while the receiving device is authenticated to a wireless power transmission system.

BACKGROUND

By way of brief background, conventional wireless power transmission can allow a receiving device to receive power that is transmitted wirelessly, though typically line-of-sight, to the receiving device. Wireless power transmission can cause a higher energy density in a region. A receiving device in that higher energy density region can generate power from the higher energy density, e.g., a phone can charge wirelessly when placed in a region of higher energy density caused by transmission of radio frequency (RF) energy to the region.

DETAILED DESCRIPTION

Figure 1:
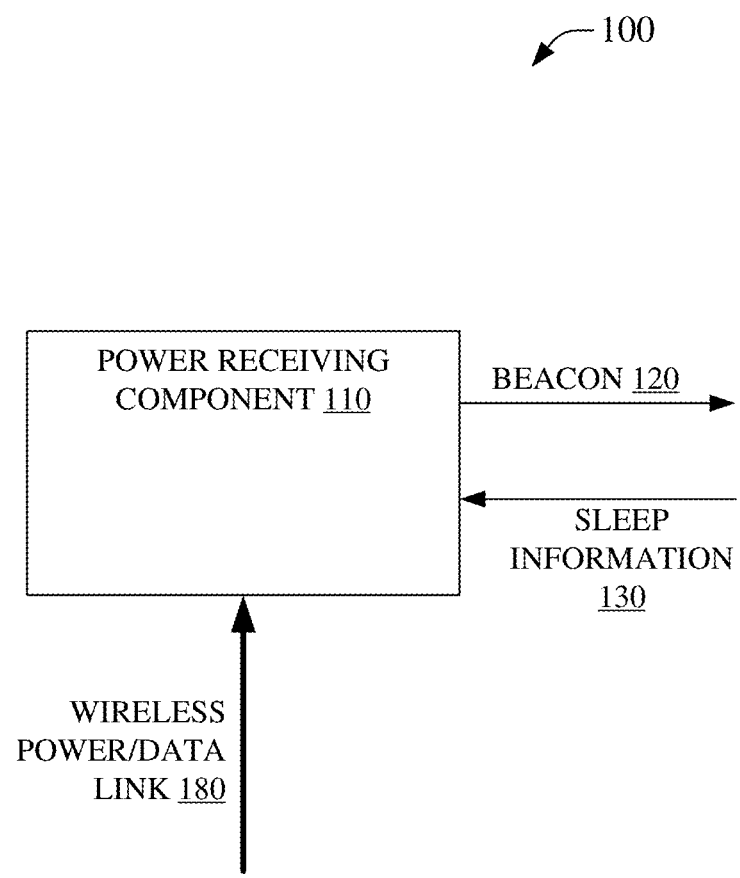
FIG. 1 is an illustration of an example system that can enable a wireless power receiving device state change, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Conventional wireless power transmission typically allows a receiving device to receive power that is wirelessly directed to the receiving device, typically in a line-of-sight transmission. Wireless power transmission can cause a higher energy density in a region, and a receiving device in that region can generate power from the higher energy density, e.g., a video game controller can charge wirelessly when placed in a region of higher energy density caused by transmission of electromagnetic energy to the region. Conventional wireless charging can be associated with localized creation of a higher energy density region, e.g., a wireless charging 'pad' can generate a higher energy density region proximate to the pad, such that when a device is placed on the pad, the device can absorb a portion of the higher energy density in the localized area for power of the device, etc. In this example, the higher energy density region is typically small and proximate to the pad.

Wireless power transmission is evolving and can create a higher energy density area at nearly any place in a space, e.g., line-of-sight, non-line-of-sight, etc. As such, for example, wireless power can be directed to one or more devices at one or more various locations in a given space, such as powering a game controller on a coffee table, a cell phone on a desk, security cameras in the corners of the room, etc. It can be desirable to control transmission of wireless power to receiving devices that meet standards, e.g., safety standards, quality standards, etc. As an example, it can be desirable to transmit wireless power only to receiving devices that are produced in accordance with designated quality and safety requirements, which can serve to reduce the likelihood of a poor quality, unsafe, or counterfeit device having power transmitted to it. It can easily be understood that a counterfeit receiving device may have inferior design, lower quality components, etc., that can lead to safety issues where wireless power is directed at them. In an aspect, authenticating a receiving device to a wireless power transmission system (WPTS) can facilitate directing wireless power transmissions to authenticated devices and reducing the likelihood of transmitting power to unauthenticated devices. This can reduce the possibility of transmitting wireless power to counterfeit or other determined receiving devices, for example, where a produced model of a receiving device is under recall, authentication can facilitate prevention of power transmission to the recalled devices, even where the recalled devices are otherwise valid.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100 that can enable a wireless power receiving device state change, in accordance with aspects of the subject disclosure. System 100 can comprise power receiving component 110. Power receiving component 110 can receive wirelessly transmitted power and convert that received power into electrical energy for a device associated with power receiving component 110. As an example, a shelf label in a grocery store can comprise power receiving component 110 or be connected to power receiving component 110 and, as such, power receiving device 110 can convert a wireless power transmission into electrical energy to operate the shelf label. As another example, a cellphone can comprise power receiving component 110 to enable converting wireless power from a higher energy density area into electricity to charge, operate, etc., the cellphone.

Power receiving component 110 can emit beacon 120. Beacon 120 can comprise information corresponding to power receiving component 110, a device comprising power receiving component 110, etc. As an example, beacon 120 can comprise an identifier, model information, a serial number, state information, energy storage device (e.g., energy storage component 260, etc.) status/health/state/condition information, a password, the current time on a local clock, cryptographic keys, integrity checking fields, an account number, etc. Beacon 120 can, in an embodiment, indicate information, e.g., delay information, wake information, sleep information, etc., that can be employed in determining a state change of power receiving component 110, devices comprising/connected to power receiving component 110, etc. As an example, beacon 120 can indicate a serial number and model of a security camera comprising power receiving component 110. In this example, a wireless power transmission system component, e.g., WPTS component 490, etc., can determine that a 500 millisecond delay can be experienced, e.g., to allow a WPTS to authenticate the security camera based on the example serial number and model. In an aspect, authentication can take more, less, or the same time as the determined delay, though typically the delay is determined to be sufficient to allow authentication during the delay. Continuing the example, the delay can be a period in which the security camera can consume less power, e.g., by not sending successive beacons while the WPTS is busy authenticating the security camera, etc. Accordingly, this delay can be a period in which the example security camera can go into a different power consuming state. Hereinafter, the term 'sleep state' can refer to one or more different power consuming states. In this example, the security camera can, 'go to sleep,' e.g., in regard to interacting with the WPTS, etc., to conserve power. In an embodiment, the sleep state can be determined based on an indication. In an aspect, sleeping, or similarly, waking, can be associated with a time value, e.g., a sleep state can be for a period of time, until a determined time, etc., a wake state can be indicated to occur after a time or at a determined time, etc. The indication can be comprised in sleep information 130, such as can be emitted by example WPTS, e.g., a communication from the example WPTS component indicating the anticipated 500 millisecond delay to allow for authentication. In an aspect, the sleep state can be a modification of a first state of a device and sleep information can comprise a modification instruction that relates to modifying a state of a device, e.g., modifying the state from a wake state to a sleep state, from a sleep state to a wake state, etc. In some embodiments, a power receiving component 110 can determine a sleep state independent of a communication from a WPTS, such as, a default sleep state after emitting a beacon, using historical sleep information from a WPTS to determine a current sleep state, based on sleep information 130 communicated to other power receiving component(s) 130, etc.

Power receiving component 110 can receive wireless power/data link 180. In an aspect, wireless power can be directed to generate an area of higher energy density proximate to power receiving component 110 via wireless power/data link 180. In an embodiment, wireless power can be directed to power receiving component 110, e.g., via wireless power/data link 180, etc., according to sleep information 130. In some embodiments wireless power can be directed to power receiving component 110 in response to a sleep period expiring, e.g., independent of authentication. In some embodiments wireless power can be directed to power receiving component 110 in response to authentication, e.g., independent of a sleep period expiring. In some embodiments wireless power can be directed to power receiving component 110 in response to authentication and a sleep period expiring, e.g., the sleep period can expire before authentication is completed and wireless power can be restricted until the later of the expiration of the sleep period or authentication occurring. In an aspect, a different level of wireless power can be emitted based on sleep information 130, e.g., a first level of power, such as a courtesy-level of power, can be emitted during the sleep period, prior to authentication, etc. In this aspect, for example, less power can be directed to power receiving component 110 until authentication/sleep state conditions are determined to be satisfied, such that the power receiving device can, in an example, receive some power that is generally considered to be of low risk even for an unauthenticated device, e.g., germane to use of the unauthenticated device, and receive increased power after authentication/sleep state conditions are determined to be satisfied that can be at a level that can be correlated to higher risk with an unauthenticated device. This can enable power receiving component 110 to receive power, for example, in a pre-authentication state that can then transition to higher power based on and in response to authentication to the WPTS.

Figure 2:
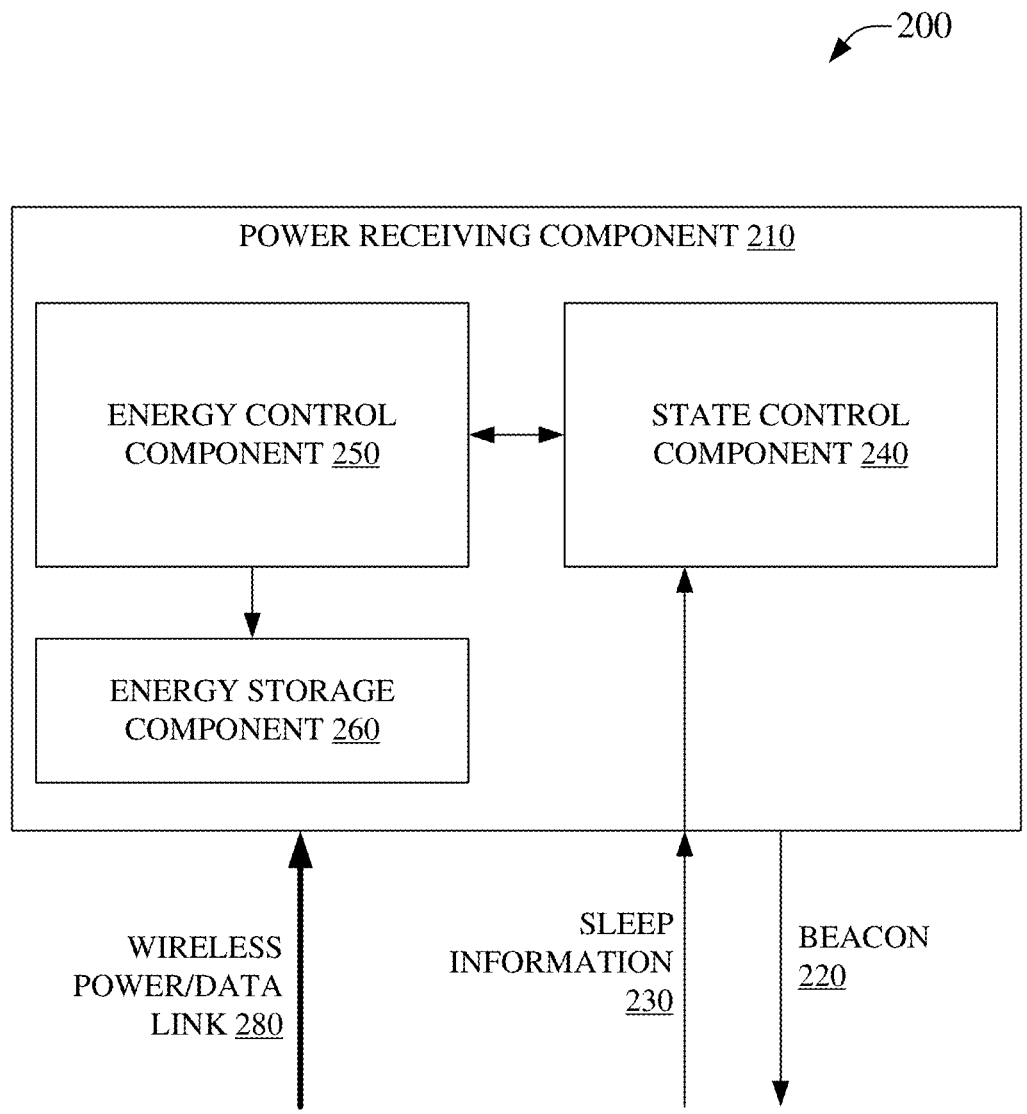
FIG. 2 is an illustration of an example system that can facilitate a wireless power receiving device energy usage state change, in accordance with aspects of the subject disclosure.

FIG. 2 is an illustration of a system 200, which can facilitate a wireless power receiving device energy usage state change, in accordance with aspects of the subject disclosure. System 200 can comprise power receiving component 210. Power receiving component 210 can receive wirelessly transmitted power and convert that received power into electrical energy for a device associated with power receiving component 210. Power receiving component 210 can emit beacon 220. Beacon 220 can comprise information corresponding to power receiving component 210, a device comprising power receiving component 210, etc. Beacon 220 can, in an embodiment, indicate information that can be employed in determining a state change of power receiving component 210, devices comprising/connected to power receiving component 210, etc. In an aspect, authentication can occur before, during, or after a determined delay, though typically the delay is determined to be sufficient to allow authentication during the delay, and the delay can be communicated to power receiving component 210, via sleep information 230, to facilitate the determining the state change of power receiving component 210. Sleep information 230 can be a communication from a WPTS component indicating information correlated to a delay, e.g., to allow for authentication, etc. In some embodiments, a power receiving component 210 can determine a sleep state independent of receiving sleep information 230 from a WPTS component in response to beacon 220, such as, a default sleep state after emitting a beacon, using historical sleep information from a WPTS to determine a current sleep state, based on other sleep information communicated to other power receiving component(s), etc.

Power receiving component 210 can comprise state control component 240 that can alter a state of power receiving component 210. In an aspect, state control component 240 can adapt an energy consumption state of power receiving component 210, a device comprising power receiving component 210, a device connected to power receiving component 210, etc. In another aspect, power receiving component 210 can communicate with energy control component 250 that can adapt an energy consumption state of power receiving component 210, a device comprising power receiving component 210, a device connected to power receiving component 210, etc. In some embodiments, energy control component 250 can be comprised in a device external to power receiving component 210, e.g., state control component 240 of power receiving component 210 can signal energy control component 250 outside of power receiving component 210, such as a power management component of a device comprising or connected to power receiving component 210. As an example, a laptop computer can comprise energy control component 250, such as the laptop power management system, etc., allowing state control component 240 to communicate with energy control component 250 to adapt a power state of the laptop computer itself, a power state of power receiving component 210 itself, combinations thereof, etc.

In an aspect, system 200 can comprise energy storage component 260, which can store energy, e.g., electrical energy, chemical energy, electrical charge, heat, pressure, etc. As examples, energy storage component 260 can be a rechargeable battery, a capacitor, an inductor, a heat reservoir, a micro-turbine and pressure vessel, a main-spring, etc. It is noted that energy storage component 260 can comprise any technology for storing energy, e.g., direct energy storage, transformative energy storage, etc., and that all such technologies are to be considered within the scope of the instant disclosure, even where not explicitly disclosed for the sake of clarity and brevity. In an embodiment, energy storage component 260 can be comprised in power receiving component 210, e.g., as illustrated. In some embodiments, energy storage component 260 can be comprised in a device connected to, comprising, etc., power receiving component 210, e.g., a cell phone battery, an electronic shelf tag capacitor, etc., connected to power receiving component 210. In some embodiments, more than one energy storage component can be comprised in a device or system, wherein one or more of the energy storage components can be comprised in power receiving component 210, comprised in a device connected to power receiving component 210, comprised in a device comprising power receiving component 210, etc. State control component 240 can receive sleep information 230, such that a state of power receiving component 210 can be modified, e.g., energy storage component 260 can dispense less power based on control of a state of power receiving component 210, a device comprising/connected to power receiving component 210, etc., based on sleep information 230. As an example, an electronic shelf tag comprising illustrated power receiving component 210, wherein energy storage component 260 can be a capacitor, can receive sleep information 230 that can be indicative of a 1500 millisecond sleep period, whereby the state control component 240 can determine that the shelf tag will go into a deep-sleep state (for example, a state that only preserves RAM memory, etc.) such that energy control component 250 can direct power from the capacitor to shelf tag components that are determined to be powered during the deep-sleep state, thereby preserving charge stored on the capacitor until expiration of the example 1500 millisecond sleep period.

In an embodiment, power receiving component 210 can receive wireless power/data link 280. In an aspect, wireless power can be directed to generate an area of higher energy density proximate to power receiving component 210 via wireless power/data link 280. In an embodiment, wireless power can be directed to power receiving component 210, e.g., via wireless power/data link 280, etc., according to sleep information 230. In some embodiments wireless power can be directed to power receiving component 210 in response to a sleep period expiring, e.g., independent of authentication. In some embodiments wireless power can be directed to power receiving component 210 in response to authentication, e.g., independent of a sleep period expiring. In some embodiments wireless power can be directed to power receiving component 210 in response to authentication and a sleep period expiring, e.g., the sleep period can expire before authentication is completed and wireless power can be restricted until the later of the expiration of the sleep period or authentication occurring. In an aspect, a different level of wireless power can be emitted based on sleep information 230, e.g., a first level of power, such as a courtesy-level of power, can be emitted during the sleep period, prior to authentication, etc. In this aspect, for example, less power can be directed to power receiving component 210 until authentication/sleep state conditions are determined to be satisfied, such that the power receiving device can, in an example, receive some power that is generally considered to be of low risk even for an unauthenticated device, and receive increased power after authentication/sleep state conditions are determined to be satisfied that can be at a level that can be correlated to higher risk with an unauthenticated device. This can enable power receiving component 210 to receive power, for example, in a pre-authentication state that can then transition to higher power based on and in response to authentication to the WPTS.

Figure 3:
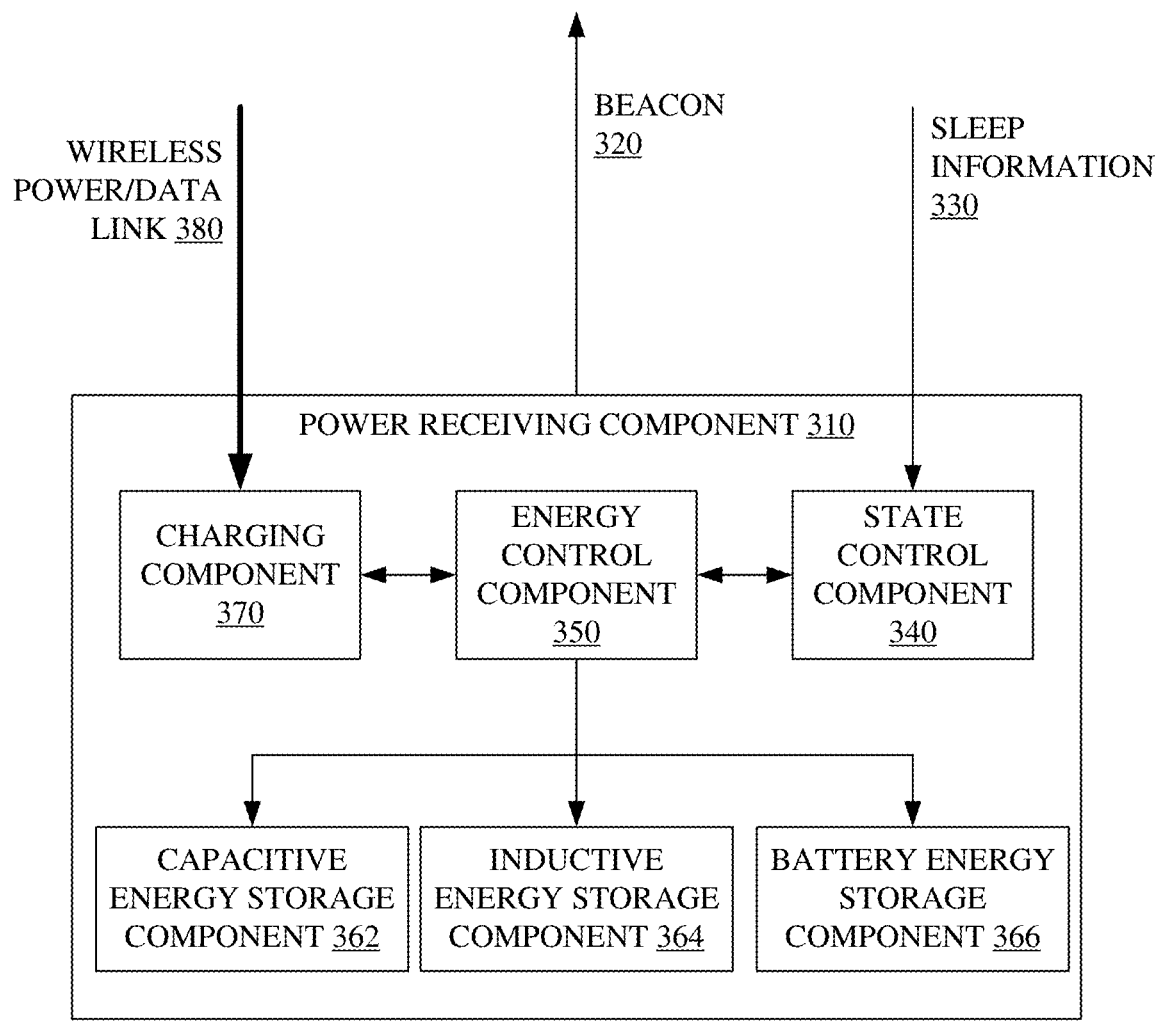
FIG. 3 is an illustration of an example system that can enable altering a wireless power receiving device energy use state change to reduce energy consumption of different energy storage components, in accordance with aspects of the subject disclosure.

FIG. 3 is an illustration of a system 300 that can enable altering a wireless power receiving device energy use state change to reduce energy consumption of different energy storage components, in accordance with aspects of the subject disclosure. System 300 can comprise power receiving component 310. Power receiving component 310 can receive wirelessly transmitted power and convert that received power into electrical energy for a device associated with power receiving component 310. Power receiving component 310 can emit beacon 320. Beacon 320 can comprise information corresponding to power receiving component 310, a device comprising power receiving component 310, a device communicating with power receiving component 310, etc. Beacon 320 can, in an embodiment, indicate information that can be employed in determining a state change of power receiving component 310, devices comprising/connected to power receiving component 310, etc. In an aspect, authentication can occur before, during, or after a determined delay, though typically the delay is determined to be sufficient to allow authentication during the delay, and the delay can be communicated to power receiving component 310, via sleep information 330, to facilitate the determining the state change of power receiving component 310. Sleep information 330 can be a communication from a WPTS component indicating information correlated to a delay, e.g., to allow for authentication, etc. In some embodiments, a power receiving component 310 can determine a sleep state independent of receiving sleep information 330 from a WPTS component in response to beacon 320, such as, a default sleep state after emitting a beacon, using historical sleep information from a WPTS to determine a current sleep state, based on other sleep information communicated to other power receiving component(s), etc.

Power receiving component 310 can comprise state control component 340 that can alter a state of power receiving component 310. In an aspect, state control component 340 can adapt an energy consumption state of power receiving component 310, a device comprising power receiving component 310, a device connected to power receiving component 310, etc. In another aspect, power receiving component 310 can communicate with energy control component 350 that can adapt an energy consumption state of power receiving component 310, a device comprising power receiving component 310, a device connected to power receiving component 310, etc. In some embodiments, energy control component 350 can be comprised in a device external to power receiving component 310, e.g., state control component 340 of power receiving component 310 can signal energy control component 350 outside of power receiving component 310, such as a power management component of a device comprising or connected to power receiving component 310.

In an aspect, system 300 can comprise an energy storage component, e.g., capacity energy storage component 362, inductive energy storage component 364, battery storage component 366, etc., which can store energy, e.g., electrical energy, chemical energy, electrical charge, heat, pressure, etc. It is noted that an energy storage component can comprise any technology for storing energy, e.g., direct energy storage, transformative energy storage, etc., and that all such technologies are to be considered within the scope of the instant disclosure, even where not explicitly disclosed for the sake of clarity and brevity. In an embodiment, an energy storage component, e.g., capacity energy storage component 362, inductive energy storage component 364, battery storage component 366, etc., can be comprised in power receiving component 310, e.g., as illustrated. In some embodiments, an energy storage component can be comprised in a device connected to, comprising, etc., power receiving component 310. In some embodiments, more than one energy storage component, e.g., capacity energy storage component 362, inductive energy storage component 364, battery storage component 366, etc., can be comprised in a device or system, wherein one or more of the energy storage components can be comprised in power receiving component 310, comprised in a device connected to power receiving component 310, comprised in a device comprising power receiving component 310, etc. State control component 340 can receive sleep information 330, such that a state of power receiving component 310 can be modified.

In an embodiment, power receiving component 310 can receive wireless power/data link 380, e.g., via charging component 370. In an aspect, wireless power can be directed to generate an area of higher energy density proximate to power receiving component 310 via wireless power/data link 380. In an embodiment, wireless power can be directed to charging component 370 of power receiving component 310, e.g., via wireless power/data link 380, etc., according to sleep information 330. In an embodiment, charging component 370 can be comprised in power receiving component 310. In another embodiment, charging component 370 can be communicatively connected to power receiving component 310 but located external to power receiving component 310.

In an aspect, wireless power can be received by charging component 370 independent of a sleep state. Accordingly, power receiving component 310 can be in a sleep state but can still receive wireless power. As such, a first level of wireless power can be directed to power receiving component 310 independent of a sleep state or change in sleep state. However, a second level of wireless power can be directed to power receiving component 310 based on a sleep state or change in sleep state. In some embodiments wireless power can be directed to power receiving component 310 in response to a sleep period expiring, e.g., independent of authentication. In some embodiments wireless power can be directed to power receiving component 310 in response to authentication, e.g., independent of a sleep period expiring. In some embodiments wireless power can be directed to power receiving component 310 in response to authentication and a sleep period expiring, e.g., the sleep period can expire before authentication is completed and wireless power can be restricted until the later of the expiration of the sleep period or authentication occurring.

Different levels of wireless power can be emitted based on sleep information 330, e.g., a first level of power, such as a courtesy-level of power, can be emitted during the sleep period, prior to authentication, etc. In this aspect, for example, less power can be directed to power receiving component 310 until authentication/sleep state conditions are determined to be satisfied, such that the power receiving device can, in an example, receive some power that is generally considered to be of low risk even for an unauthenticated device, and receive increased power after authentication/sleep state conditions are determined to be satisfied that can be at a level that can be correlated to higher risk with an unauthenticated device. This can enable power receiving component 310 to receive power, for example, in a pre-authentication state that can then transition to higher power based on and in response to authentication to the WPTS. In an embodiment, 'courtesy-level' wireless power can be a level of power that is provided to power receiving component that is determined to be safe, while other power levels can be more energy dense and can be restricted to transmission to authenticated devices, e.g., for safety, reliability, subscriber agreement, reasons. As an example, a courtesy-level power transmission can be deemed low risk for all power receiving devices, a second level of power transmission can be deemed safe for a first type of power receiving device, and third level of power transmission can be deemed safe for a second type of power receiving device. Accordingly, in this example, courtesy-level power can be provided to all receiving devices, while the second level of power can be provided only to authenticated first-type power receiving device and third level power can be provided only to authenticated second-type power receiving devices. As such, sleep information 330 can provide a window for authenticating the type of device prior to transmitting power above the courtesy-level. Moreover, for example, a fourth level of power can be restricted to subscribing devices of a third type, such that in response to authentication of the power receiving device as being a third-type device and also being authenticated as a subscribing device, fourth-level power can be provided to charging component 370.

Figure 4:
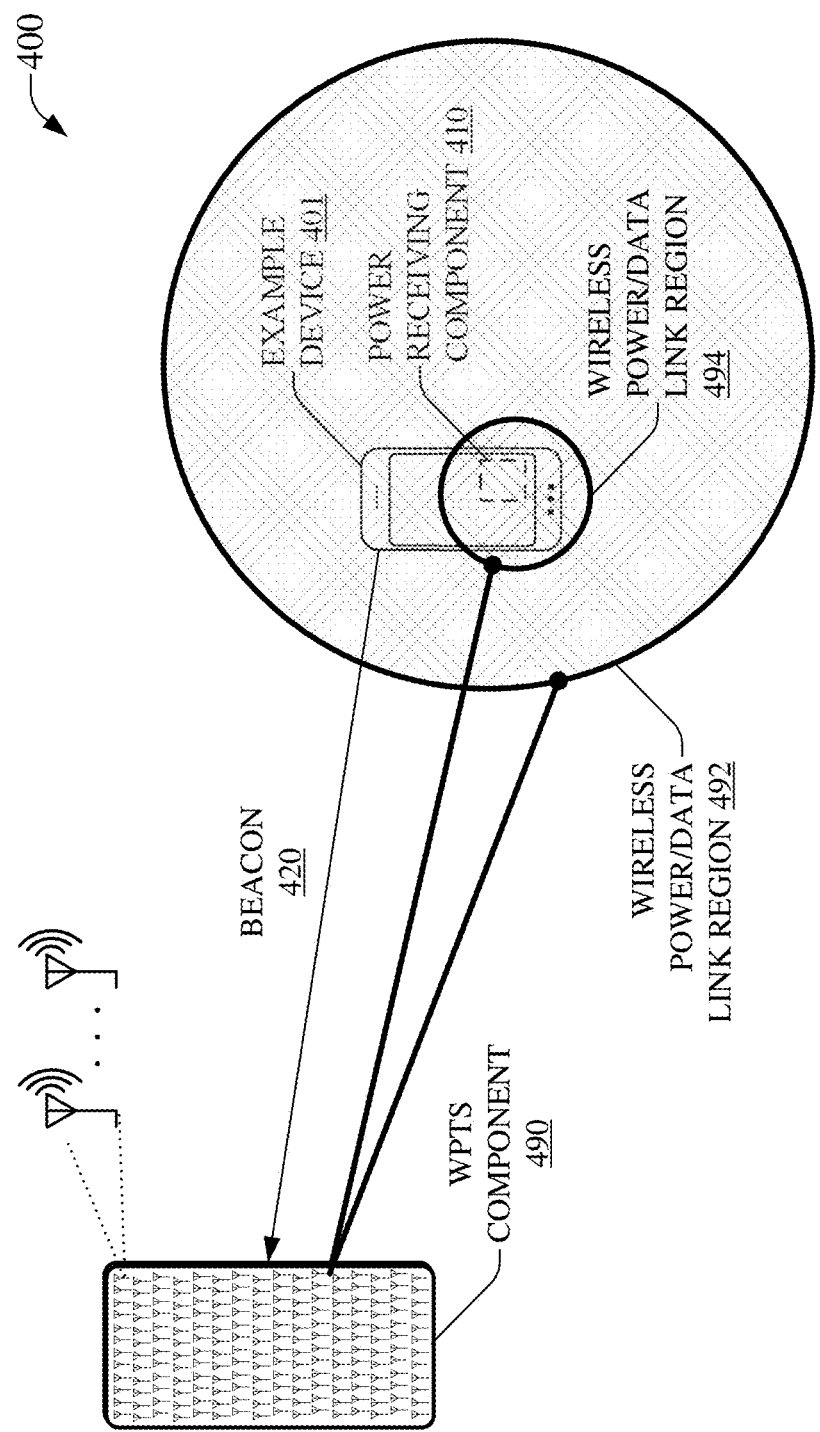
FIG. 4 an illustration of an example system that can enable adapting a wireless power receiving device state change based on information from a wireless power transmission system device, in accordance with aspects of the subject disclosure.

FIG. 4 an illustration system 400 that can enable adapting a wireless power receiving device state change based on information from wireless power transmission system component 490, in accordance with aspects of the subject disclosure. System 400 can comprise power receiving component 410. Power receiving component 410 can receive wirelessly transmitted power and convert that received power into electrical energy for a device associated with power receiving component 410. Power receiving component 410 can emit beacon 420. Beacon 420 can comprise information corresponding to power receiving component 410, a device comprising power receiving component 410, a device communicating with power receiving component 410, etc. Beacon 420 can, in an embodiment, indicate information that can be employed in determining a state change of power receiving component 410, determining devices comprising/connected to power receiving component 410, such as device 401, or other determinations. In an aspect, authentication can occur before, during, or after a determined delay, though typically the delay is determined to be sufficient to allow authentication during the delay, and the delay can be communicated to power receiving component 410, via sleep information, to facilitate the determining the state change of power receiving component 410. In an embodiment, the delay can be a period of time, an absolute time, etc. Sleep information can be a communication from WPTS component 490 indicating information correlated to a delay, e.g., to allow for authentication, etc. In an aspect, sleep information can be communicated via wireless power/data link region 492, 494, etc., wireless power/data link 180, 280, 380, etc., or nearly any other communications link, e.g., sleep information 130, 230, 330, etc. In some embodiments, power receiving component 410 can determine a sleep state independent of receiving sleep information from a WPTS component 490 in response to beacon 420, such as, a default sleep state after emitting a beacon, using historical sleep information from a WPTS to determine a current sleep state, based on other sleep information communicated to other power receiving component(s), using identification information from a WPTS to select an authentication delay associated with the WPTS identification information, using a type/model of WPTS to select an authentication delay associated with that type/model of WPTS, etc.

WPTS component 490 can send wireless power to power receiving device 410. In an embodiment, WPTS component 490 can comprise an array of antennas to send RF energy in a manner that can cause a higher energy density area, e.g., wireless power/data link 492, 494, etc., see FIGS. 9-11, 13, etc. In an aspect, WPTS component 490 can send wireless power and/or sleep information via wireless power/data link 492, 494, etc. Wireless power/data link 492, 494, etc., can form an area of higher energy density, e.g., proximate to power receiving component 410, to enable power receiving component 410 to harvest the wireless energy, and receive any data, e.g., sleep information 130, 230, 330, etc., sent via wireless power/data link 492, 494, etc. In some embodiments, sleep information can be 'wake information' without departing from the scope of the disclosed subject matter, e.g., indicating a time to wake rather than indicating a time to be asleep. This high energy density area, in some embodiments, can be caused by constructive and/or destructive interference of electromagnetic (EM) waves in a region. The high energy density of an area can enable power receiving component 410 to 'harvest' the EM energy of the high energy density area for use as electrical energy in example device 401, etc.

In an aspect, a high energy density area can be of different shapes and sizes. Moreover, even where wireless power/data link region 492, 494, etc., are illustrated as two-dimensional for ease of illustration, the instant disclosure includes three-dimensional wireless power/data link region 492, 494, etc. Still further, while wireless power/data link region 492, 494, etc., are illustrated as being circular, it is noted that wireless power/data link region 492, 494, etc., can be of any two-dimensional or three-dimensional shape, e.g., a circle, sphere, ellipsoid, toroid, annulus, tear-drop shaped, comprising multiple tear-drop shapes, combinations thereof, etc. As illustrated, wireless power/data link 492 can be of larger area than wireless power/data link 494. In some embodiments this can be a result of the wireless power transmission frequency, for example, where power is transmitted at 2.4 GHz, a minimum area of the corresponding higher energy density area can be, in two-dimensional space, generally 10× larger than a minimum area of a higher energy density area corresponding to wireless power transmission at 24 GHz. Of note, the volume in three-dimensional space can similarly scale accordingly as a function of transmission frequency. Moreover, wireless power/data link 492, 494, etc., can send data and wireless power on different channels, in different phases, in different times, etc., and all such separations of power and data are to be considered within the scope of the instant disclosure.

Different levels of wireless power can be emitted based on sleep information, e.g., a first level of power, such as a courtesy-level of power, can be emitted during the sleep period, prior to authentication, etc. In this aspect, for example, less power can be directed to power receiving component 410 until authentication/sleep state conditions are determined to be satisfied, such that the power receiving device can, in an example, receive some power that is generally considered to be of low risk even for an unauthenticated device, and receive increased power after authentication/sleep state conditions are determined to be satisfied that can be at a level that can be correlated to higher risk with an unauthenticated device. This can enable power receiving component 410 to receive power, for example, in a pre-authentication state that can then transition to higher power based on and in response to authentication to WPTS component 490. In an embodiment, 'courtesy-level' wireless power can be a level of power that is provided to power receiving component that is determined to be lower risk compared to other power levels, while the other power levels can be more energy dense and can be restricted to transmission, for example, to authenticated devices, e.g., for safety, reliability, subscriber agreement, reasons. As an example, a courtesy-level power transmission can be deemed low risk for all power receiving devices, a second level of power transmission can be deemed safe for a first type of power receiving device, and third level of power transmission can be deemed safe for a second type of power receiving device. Accordingly, in this example, courtesy-level power can be provided to all receiving devices, while the second level of power can be provided only to authenticated first-type power receiving device and third level power can be provided only to authenticated second-type power receiving devices. As such, sleep information 430 can provide a window for authenticating the type of device prior to transmitting power above the courtesy-level. Moreover, for example, a fourth level of power can be restricted to subscribing devices of a third type, such that in response to authentication of the power receiving device as being a third-type device and also being authenticated as a subscribing device, fourth-level power can be provided to charging component 470.

Figure 5:
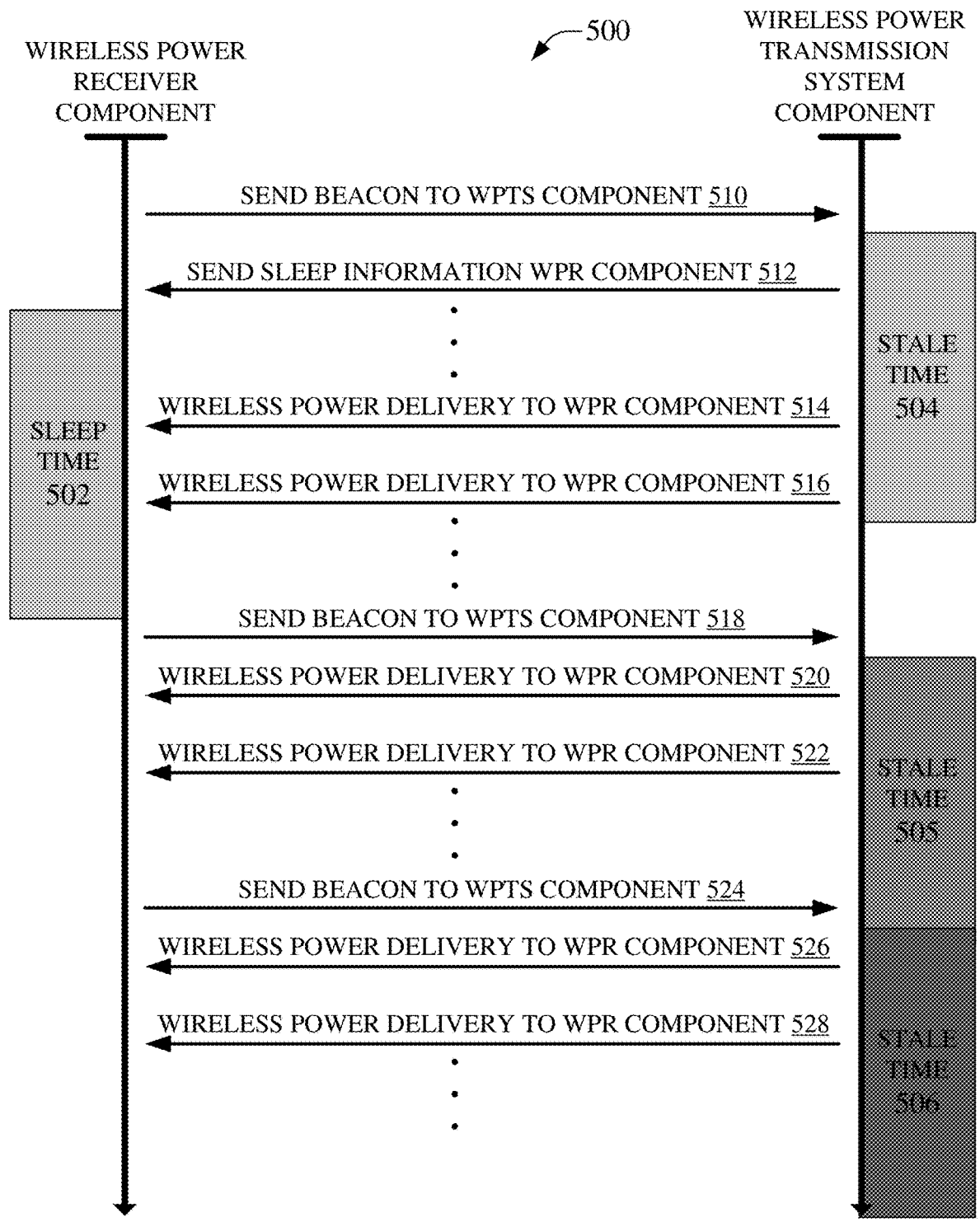
FIG. 5 an illustration of example communications that can enable adaptation of a wireless power receiving device state, in accordance with aspects of the subject disclosure.

FIG. 5 is an illustration of example communications 500 that can enable adaptation of a wireless power receiving device state, in accordance with aspects of the subject disclosure. Example communications 500 can comprise communications between a wireless power receiver (WPR) component and a wireless power transmission system component. The wireless power receiver component can emit a beacon at 510 that can be received by the WPTS component. Where the beacon is received by the WPTS component, a stale beacon timer can begin at the WPTS component, e.g., stale time 504. In an aspect a stale time, e.g., stale time 504, can be related to a time after which conditions can be presumed to have changed, for example something/someone may have moved and power transmission should be adapted accordingly, etc. In response to the beacon, the WPTS component can send sleep information to the WPR component at 512. The sleep information can be determined to correspond to a period in which further communications can be superfluous, e.g., a delay related to authenticating the WPR component to the WPTS component, etc. In response, the WPR component can enter a sleep state, e.g., as indicated by sleep time 502.

In an aspect, the WPTS component can transmit power while the WPR component is sleeping, e.g., 514, 516, etc. In an embodiment, the WPTS component can send a courtesy-level of power before, during, or after authentication, although typically after authentication another level of power can be transmitted, as is disclosed elsewhere herein. In another embodiment, the WPTS component may not send power before authentication occurs, e.g., 514, 516, etc., can occur only after authentication. In further embodiment, the WPTS component may not send power before both authentication occurs and sleep time 502 expires, e.g., 514, 516, etc., may not occur at all in some embodiments.

In example communications 500, upon expiration of sleep time 502, WPR component can send another beacon that can be received by the WPTS component, e.g., at 518. In response to the beacon, a second stale time 505 for the instant beacon can be initiated and wireless power can be sent at 520. It will be noted that where the WPR component has been authenticated to the WPTS component, further sleep information need not be sent in example communications 500, although in other examples, subsequent sleep information can be communicated and such examples are to be considered within the scope of the instant disclosure. Further, in response to the beacon at 518, and while the beacon has not become stale, e.g., while stale time 505 has not elapsed, wireless power transmission can continue, e.g., 522, etc.

Typically, prior to the beacon at 518 going stale, a further beacon can be emitted by WPR component, e.g., at 524. This can result in setting subsequent stale time 506, to measure when the beacon at 524 becomes stale. As before, while the beacon from 524 has not become stale, e.g., while stale time 506 has not elapsed, wireless power transmission can continue, e.g., 526, 528, etc.

In an aspect, between stale time 504 and the beacon at 518, the WPTS component can consider the beacon form 510 as stale and can alter transmitted power, e.g., suspend power transmission, change the level of power transmission, etc. As an example, where the WPR component is sent to sleep in response to sleep information at 512, and the WPR component is authenticated after sending a first level of power at 514 and before stale time 504 expires, the power delivered at 516 can be at a second level of power. However, upon expiration of stale time 504, further power transmission can be truncated or, in some examples, reduced back to the first level of power. Accordingly, example communications 500 can support transmission of different power levels, such as the examples described elsewhere herein.

Figure 6:
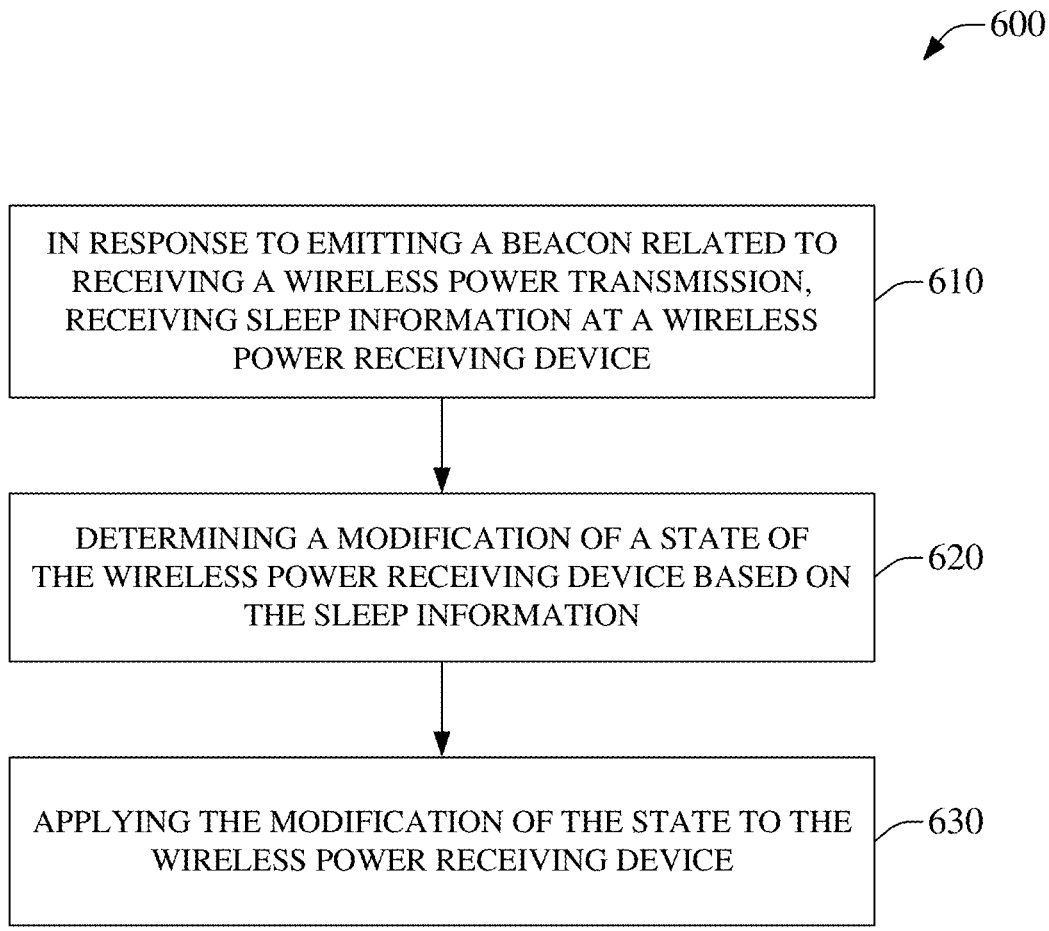
FIG. 6 is an illustration of an example method enabling adaptation of a wireless power receiving device state, in accordance with aspects of the subject disclosure.
Figure 7:
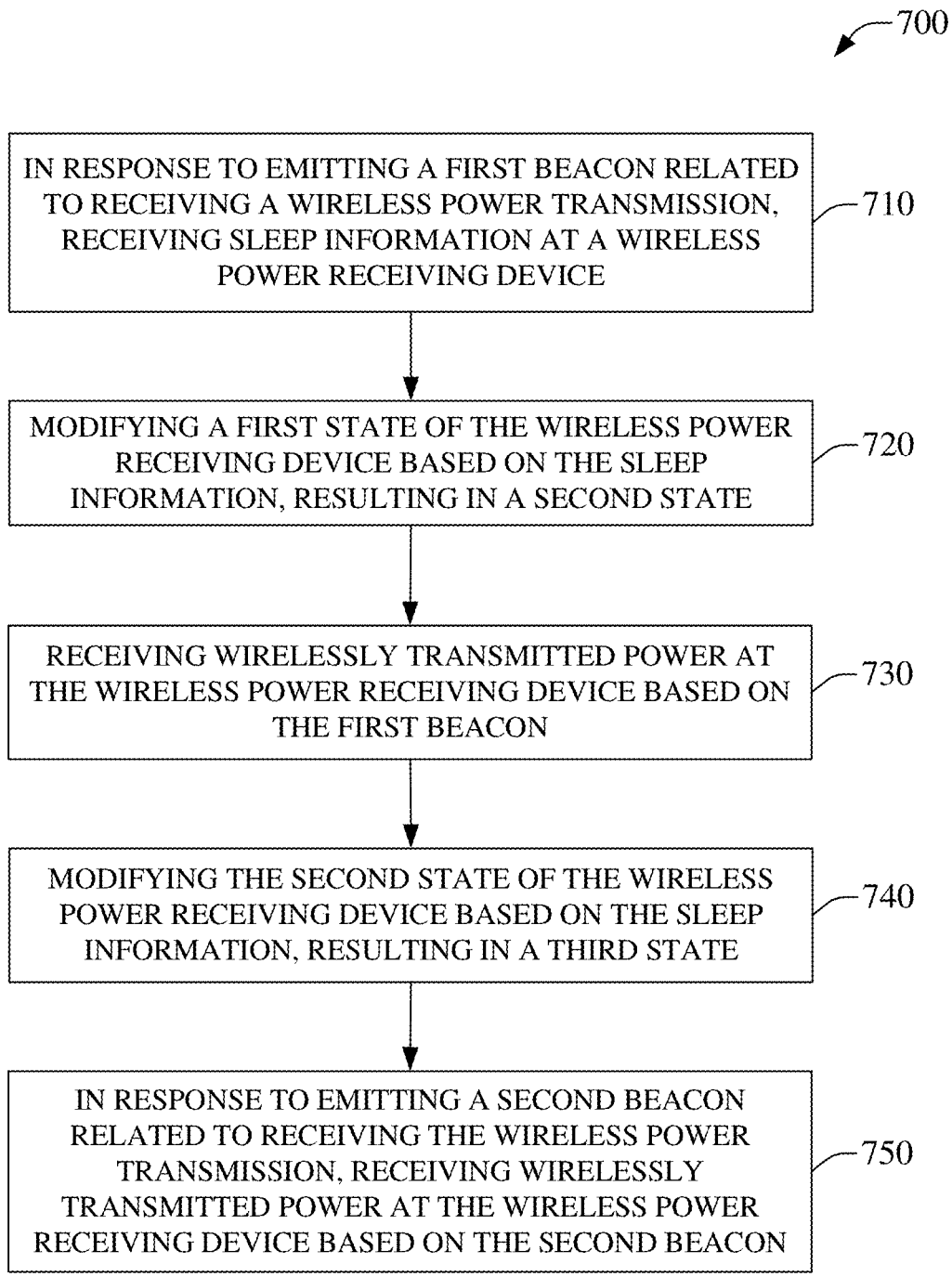
FIG. 7 illustrates an example method enabling a wireless power receiving device state change based on successive beacons, in accordance with aspects of the subject disclosure.
Figure 8:
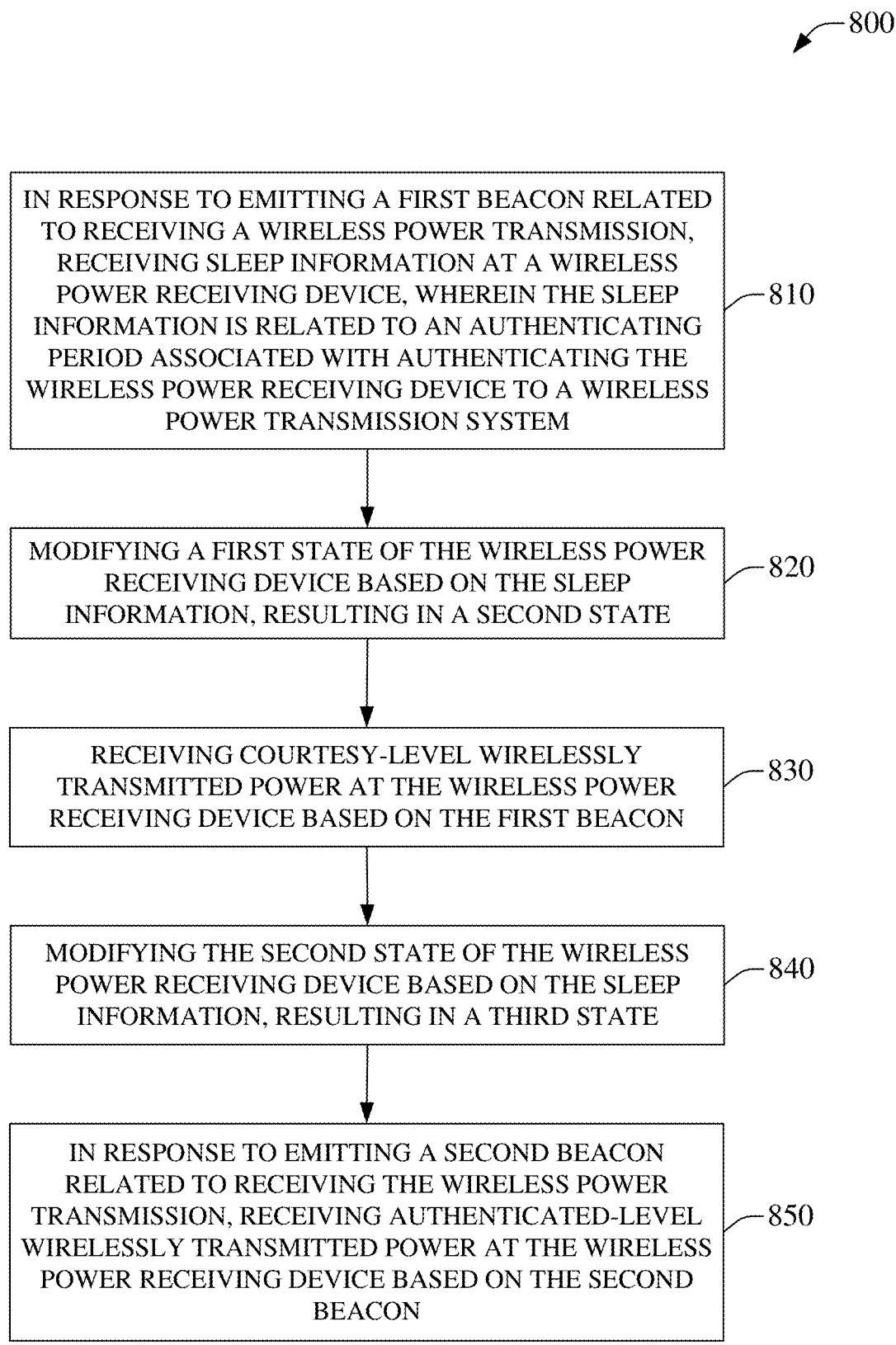
FIG. 8 illustrates an example method facilitating a wireless power receiving device state change while enabling courtesy-level wireless power reception, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600, which can enable adaptation of a wireless power receiving device state, in accordance with aspects of the subject disclosure. At 610, method 600 can comprise receiving sleep information at a wireless power receiving device. The sleep information can be received in response to the wireless power receiving device emitting a beacon related to receiving a wireless power transmission. The beacon can comprise information corresponding to the power receiving component, a device comprising the power receiving component, etc. As an example, the beacon can comprise an identifier, model information, a serial number, state information, energy storage device status/health/state/condition information, a password, the current time on a local clock, cryptographic keys, integrity checking fields, the current time on a local clock, cryptographic keys, integrity checking fields, an account number, etc. The beacon can, in an embodiment, indicate information that can be employed in determining the sleep information that can, in turn, facilitate determining state change of the power receiving component, devices comprising/connected to the power receiving component, etc. The sleep information can, in some embodiments, relate to a time period for authenticating the wireless power receiving device to a wireless power transmission system/component. The example authentication can take more, less, or the same time as a determined delay reflected in the sleep information, though typically the delay is determined to be sufficient to allow authentication during the delay. Sleeping the wireless power receiving device, e.g., in regard to interacting with the WPTS, etc., can enable the wireless power receiving device to conserve power. In an embodiment, the sleep state can be determined based on an indication comprised in the sleep information.

At 620, a modification of a state of the wireless power receiving device can be determined based on the sleep information. An indication comprised in the sleep information can be emitted by, for example a WPTS component, e.g., as a communication from the example WPTS component, e.g., indicating an anticipated delay to allow for authentication, etc. In some embodiments, a wireless power receiving component can determine a sleep state independent of a communication from a WPTS, such as, a default sleep state after emitting a beacon, using historical sleep information from a WPTS to determine a current sleep state, based on sleep information communicated to other power receiving component(s), etc.

Method 600, at 630, can facilitate applying the modification determined at 620 to the wireless power receiving device. At this point, method 600 can end. In some embodiments wireless power can be directed to the wireless power receiving component in response to a sleep period expiring, e.g., independent of authentication. In some embodiments wireless power can be directed to the wireless power receiving component in response to authentication, e.g., independent of a sleep period expiring. In some embodiments wireless power can be directed to the wireless power receiving component in response to authentication and a sleep period expiring, e.g., the sleep period can expire before authentication is completed and wireless power can be restricted until the later of the expiration of the sleep period or authentication occurring. In an aspect, a different level of wireless power can be emitted based on the sleep information, e.g., a first level of power, such as a courtesy-level of power, can be emitted during the sleep period, prior to authentication, etc. In this aspect, for example, less power can be directed to the wireless power receiving component until authentication/sleep state conditions are determined to be satisfied, such that the power receiving device can, in an example, receive some power that is generally considered to be of low risk even for an unauthenticated device, and receive increased power after authentication/sleep state conditions are determined to be satisfied that can be at a level that can be correlated to higher risk with an unauthenticated device. This can enable the wireless power receiving component to receive power, for example, in a pre-authentication state that can then transition to higher power based on and in response to authentication to the WPTS.

In an aspect, the wireless power receiving device can determine a modification of a state based on the sleep information to allow it to conserve power where an delay is determined to be likely, e.g., for authenticating, etc. In an embodiment, the wireless power receiving device can determine that there is sufficient power at the device and opt not to modify the state, e.g., the wireless power receiving device can elect to remain in a current state during the anticipated delay indicated in the sleep information. In some embodiments, the wireless power receiving device can determine that to modify the state, e.g., the wireless power receiving device can elect to change a state from a current state during the anticipated delay indicated in the sleep information, e.g., different levels of sleep can be determined and/or selected by the wireless power receiving device depending on satisfying a rule related to modifying the state of the device. As an example, the device can go into a first sleep mode where further beacons are not emitted during a sleep period but other aspects of the device remain active, can go into a second sleep mode that powers down all aspects other than timers and keeping memory alive, etc. It will be noted that any and all changes to a current state are to be considered within the scope of the instant disclosure even where not explicitly recited of the sake of clarity and brevity. As such, the sleep information can comprise information to aid the wireless power receiving device in determining a state transition, can comprise instructions directing the wireless power receiving device to undergo a state transition, etc.

FIG. 7 illustrates example method 700 that facilitates a wireless power receiving device state change based on successive beacons, in accordance with aspects of the subject disclosure. Method 700, at 710, can comprise receiving sleep information at a wireless power receiving device. The sleep information can be received in response to the wireless power receiving device emitting a first beacon related to receiving a wireless power transmission. The first beacon can comprise information corresponding to the power receiving component, a device comprising the power receiving component, etc. As an example, the beacon can comprise an identifier, model information, a serial number, state information, energy storage device status/health/state/condition information, a password, the current time on a local clock, cryptographic keys, integrity checking fields, an account number, etc. The first beacon can, in an embodiment, indicate information that can be employed in determining the sleep information that can, in turn, facilitate determining state change of the power receiving component, devices comprising/connected to the power receiving component, etc. The sleep information can, in some embodiments, relate to a time period for authenticating the wireless power receiving device to a wireless power transmission system/component. The example authentication can take more, less, or the same time as a determined delay reflected in the sleep information, though typically the delay is determined to be sufficient to allow authentication during the delay. Sleeping the wireless power receiving device, e.g., in regard to interacting with the WPTS, etc., can enable the wireless power receiving device to conserve power. In an embodiment, the sleep state can be determined based on an indication comprised in the sleep information.

At 720, a modification of a first state of the wireless power receiving device can be performed based on the sleep information, resulting in a second state. An indication comprised in the sleep information can be emitted by, for example a WPTS component, e.g., as a communication from the example WPTS component, e.g., indicating an anticipated delay to allow for authentication, etc. In some embodiments, a wireless power receiving component can determine a sleep state independent of a communication from a WPTS, such as, a default sleep state after emitting a beacon, using historical sleep information from a WPTS to determine a current sleep state, based on sleep information communicated to other power receiving component(s), etc. In some embodiments wireless power can be directed to the wireless power receiving component in response to a sleep period expiring, e.g., independent of authentication. In some embodiments wireless power can be directed to the wireless power receiving component in response to authentication, e.g., independent of a sleep period expiring. In some embodiments wireless power can be directed to the wireless power receiving component in response to authentication and a sleep period expiring, e.g., the sleep period can expire before authentication is completed and wireless power can be restricted until the later of the expiration of the sleep period or authentication occurring. In an aspect, a different level of wireless power can be emitted based on the sleep information, e.g., a first level of power, such as a courtesy-level of power, can be emitted during the sleep period, prior to authentication, etc. In this aspect, for example, less power can be directed to the wireless power receiving component until authentication/sleep state conditions are determined to be satisfied, such that the power receiving device can, in an example, receive some power that is generally considered to be of low risk even for an unauthenticated device, and receive increased power after authentication/sleep state conditions are determined to be satisfied that can be at a level that can be correlated to higher risk with an unauthenticated device. This can enable the wireless power receiving component to receive power, for example, in a pre-authentication state that can then transition to higher power based on and in response to authentication to the WPTS.

In an aspect, the wireless power receiving device can determine a modification of the first state into the second state based on the sleep information to allow it to conserve power where an delay is determined to be likely, e.g., for authenticating, etc. In an embodiment, the wireless power receiving device can determine that there is sufficient power at the device and opt not to modify the state, e.g., the wireless power receiving device can elect to remain in a current state during the anticipated delay indicated in the sleep information. In some embodiments, the wireless power receiving device can determine that to modify the state, e.g., the wireless power receiving device can elect to change a state from a current state during the anticipated delay indicated in the sleep information, e.g., different levels of sleep can be determined and/or selected by the wireless power receiving device depending on satisfying a rule related to modifying the state of the device. It will be noted that any and all changes to the first state into the second state are to be considered within the scope of the instant disclosure even where not explicitly recited of the sake of clarity and brevity. As such, the sleep information can comprise information to aid the wireless power receiving device in determining a state transition, can comprise instructions directing the wireless power receiving device to undergo a state transition, etc.

Method 700, at 730, can comprise receiving wirelessly transmitted power at the wireless power receiving device based on the first beacon. In an aspect, as disclosed elsewhere herein, power can be transmitted before authentication is complete, during a sleep period, upon authentication, upon authentication and expiration of a sleep period, etc. At 730, power can be received, for example, while the power receiving device is in the second state, e.g., according to the first beacon.

At 740, the second state can be modified, based on the sleep information, resulting in a third state. As an example, the first state can be a first wake state, which can transition a sleeping second state in response to the sleep information, whereby upon expiration of a sleep period indicated in the sleep information, the second state can transition into a third state that can be another awake state.

At 750, the wireless power receiving device can emit a second beacon. At this point, method 700 can end. The second beacon can be made in the third state. In response to the second beacon wireless power can be received by the wireless power receiving device based on the second beacon. The transmission according to the first beacon can be different from the transmission according to the second beacon. As an example, the transmission according to the first transmission can be at a courtesy-level of power, while the transmission according to the second beacon can be at another level of power.

FIG. 8 illustrates example method 800, which can enable a wireless power receiving device state change while enabling courtesy-level wireless power reception, in accordance with aspects of the subject disclosure. Method 800, at 810, can comprise receiving sleep information at a wireless power receiving device. The sleep information can be received in response to the wireless power receiving device emitting a first beacon related to receiving a wireless power transmission. The first beacon can comprise information corresponding to the power receiving component, a device comprising the power receiving component, etc. As an example, the beacon can comprise an identifier, model information, a serial number, state information, energy storage device status/health/state/condition information, a password, the current time on a local clock, cryptographic keys, integrity checking fields, an account number, etc. The first beacon can, in an embodiment, indicate information that can be employed in determining the sleep information that can, in turn, facilitate determining state change of the power receiving component, devices comprising/connected to the power receiving component, etc. The sleep information can, in some embodiments, relate to a time period for authenticating the wireless power receiving device to a wireless power transmission system/component. The example authentication can take more, less, or the same time as a determined delay reflected in the sleep information, though typically the delay is determined to be sufficient to allow authentication during the delay. Sleeping the wireless power receiving device, e.g., in regard to interacting with the WPTS, etc., can enable the wireless power receiving device to conserve power. In an embodiment, the sleep state can be determined based on an indication comprised in the sleep information.

At 820, a modification of a first state of the wireless power receiving device can be performed based on the sleep information, resulting in a second state. An indication comprised in the sleep information can be emitted by, for example a WPTS component, e.g., as a communication from the example WPTS component, e.g., indicating an anticipated delay to allow for authentication, etc. In some embodiments, a wireless power receiving component can determine a sleep state independent of a communication from a WPTS, such as, a default sleep state after emitting a beacon, using historical sleep information from a WPTS to determine a current sleep state, based on sleep information communicated to other power receiving component(s), etc. In some embodiments wireless power can be directed to the wireless power receiving component in response to a sleep period expiring, e.g., independent of authentication. In some embodiments wireless power can be directed to the wireless power receiving component in response to authentication, e.g., independent of a sleep period expiring. In some embodiments wireless power can be directed to the wireless power receiving component in response to authentication and a sleep period expiring, e.g., the sleep period can expire before authentication is completed and wireless power can be restricted until the later of the expiration of the sleep period or authentication occurring. In an aspect, a different level of wireless power can be emitted based on the sleep information, e.g., a first level of power, such as a courtesy-level of power, can be emitted during the sleep period, prior to authentication, etc. In this aspect, for example, less power can be directed to the wireless power receiving component until authentication/sleep state conditions are determined to be satisfied, such that the power receiving device can, in an example, receive some power that is generally considered to be of low risk even for an unauthenticated device, and receive increased power after authentication/sleep state conditions are determined to be satisfied that can be at a level that can be correlated to higher risk with an unauthenticated device. This can enable the wireless power receiving component to receive power, for example, in a pre-authentication state that can then transition to higher power based on and in response to authentication to the WPTS.

In an aspect, the wireless power receiving device can determine a modification of the first state into the second state based on the sleep information to allow it to conserve power where an delay is determined to be likely, e.g., for authenticating, etc. In an embodiment, the wireless power receiving device can determine that there is sufficient power at the device and opt not to modify the state, e.g., the wireless power receiving device can elect to remain in a current state during the anticipated delay indicated in the sleep information. In some embodiments, the wireless power receiving device can determine that to modify the state, e.g., the wireless power receiving device can elect to change a state from a current state during the anticipated delay indicated in the sleep information, e.g., different levels of sleep can be determined and/or selected by the wireless power receiving device depending on satisfying a rule related to modifying the state of the device. It will be noted that any and all changes to the first state into the second state are to be considered within the scope of the instant disclosure even where not explicitly recited of the sake of clarity and brevity. As such, the sleep information can comprise information to aid the wireless power receiving device in determining a state transition, can comprise instructions directing the wireless power receiving device to undergo a state transition, etc.

Method 800, at 830, can comprise receiving courtesy-level wirelessly transmitted power at the wireless power receiving device based on the first beacon. In an aspect, as disclosed elsewhere herein, power can be transmitted before authentication is complete, during a sleep period, upon authentication, upon authentication and expiration of a sleep period, etc. At 830, courtesy-level power can be received, for example, while the power receiving device is in the second state, e.g., according to the first beacon. Courtesy-level wireless power can be a level of power that is provided at a level determined to be safe, while other power levels can be more energy dense and can be restricted to transmission to authenticated devices, e.g., for safety, reliability, subscriber agreement, reasons. As an example, a courtesy-level power transmission can be deemed low risk for all power receiving devices, a second level of power transmission can be deemed safe for a first type of power receiving device, and third level of power transmission can be deemed safe for a second type of power receiving device. Accordingly, in this example, courtesy-level power can be provided to all receiving devices, while the second level of power can be provided only to authenticated first-type power receiving device and third level power can be provided only to authenticated second-type power receiving devices. As such, sleep information can provide a window for authenticating the type of device prior to transmitting power above the courtesy-level. Moreover, for example, a fourth level of power can be restricted to subscribing devices of a third type, such that in response to authentication of the power receiving device as being a third-type device and also being authenticated as a subscribing device, fourth-level power can be provided.

At 840, the second state can be modified, based on the sleep information, resulting in a third state. As an example, the first state can be a first wake state, which can transition a sleeping second state in response to the sleep information, whereby upon expiration of a sleep period indicated in the sleep information, the second state can transition into a third state that can be another awake state.

At 850, the wireless power receiving device can emit a second beacon. At this point, method 800 can end. The second beacon can be made in the third state. In response to the second beacon authenticated-level wireless power can be received by the wireless power receiving device based on the second beacon. The transmission according to the first beacon can be different from the transmission according to the second beacon. As an example, the transmission according to the first transmission can be at the courtesy-level of power, while the transmission according to the second beacon can be at another level of power, e.g., the authenticated-level of power.

Figure 9:
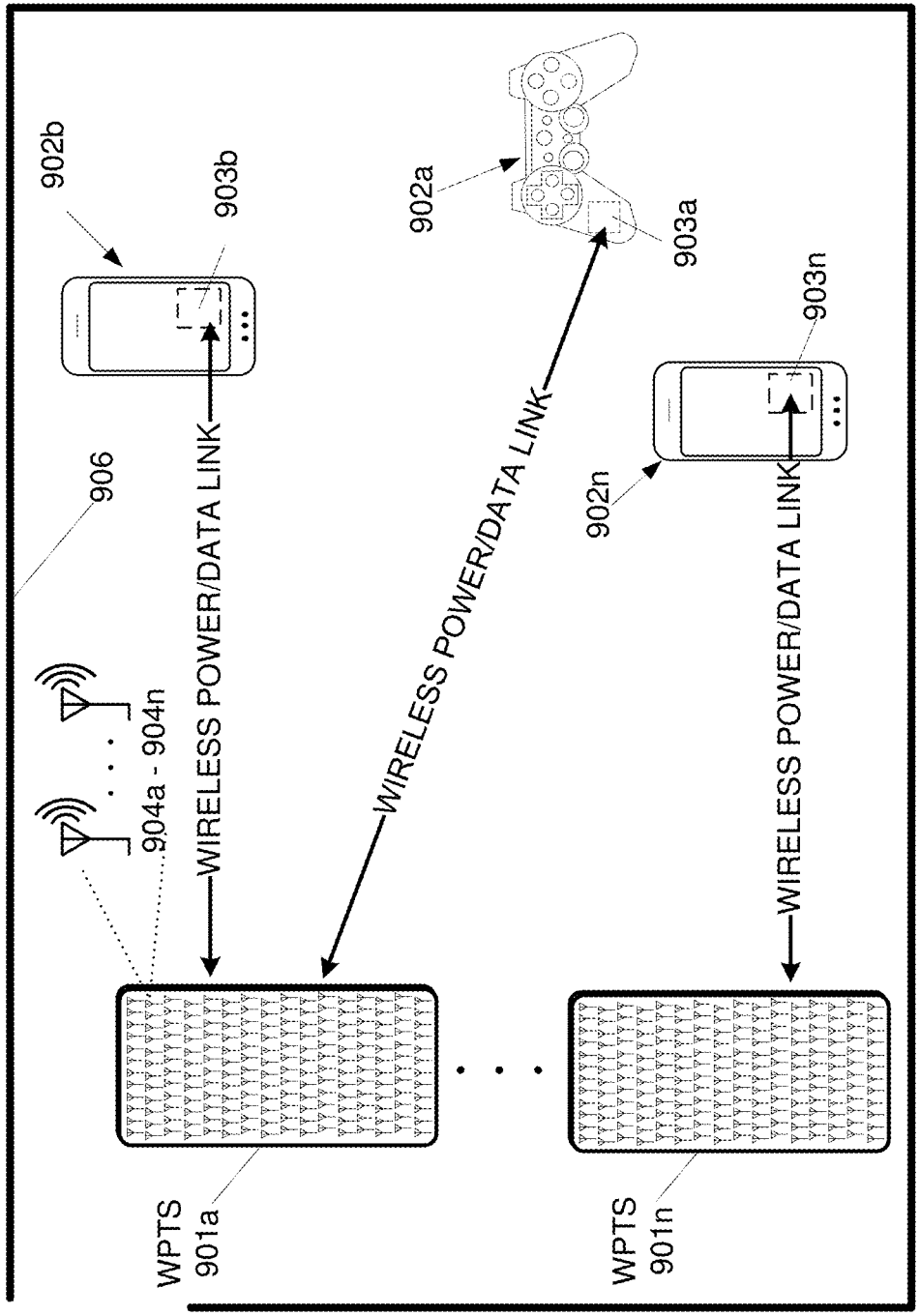
FIG. 9 depicts a block diagram of an example wireless power delivery environment illustrating wireless power delivery from one or more wireless power transmission systems to various wireless devices within the wireless power delivery environment, in accordance with various example embodiments.

FIG. 9 depicts a block diagram including an example wireless power delivery environment 900 illustrating wireless power delivery from one or more wireless power transmission systems (WPTS) 901a-n (also referred to as "wireless power delivery systems", "antenna array systems" and "wireless chargers") to various wireless devices 902a-n within the wireless power delivery environment 900, according to some embodiments. More specifically, FIG. 9 illustrates an example wireless power delivery environment 900 in which wireless power and/or data can be delivered to available wireless devices 902a-902n having one or more wireless power receiver clients 903a-903n (also referred to herein as "clients" and "wireless power receivers"). The wireless power receiver clients are configured to receive and process wireless power from one or more wireless power transmission systems 901a-901n. Components of an example wireless power receiver client 903 are shown and discussed in greater detail with reference to FIG. 12.

As shown in the example of FIG. 9, the wireless devices 902a-902n include mobile phone devices and a wireless game controller. However, the wireless devices 902a-902n can be any device or system that needs power and is capable of receiving wireless power via one or more integrated wireless power receiver clients 903a-903n. As discussed herein, the one or more integrated wireless power receiver clients receive and process power from one or more wireless power transmission systems 901a-901n and provide the power to the wireless devices 902a-902n (or internal batteries of the wireless devices) for operation thereof.

Each wireless power transmission system 901 can include multiple antennas 904a-n, e.g., an antenna array including hundreds or thousands of antennas, which are capable of delivering wireless power to wireless devices 902a-902n. In some embodiments, the antennas are adaptively-phased RF antennas. The wireless power transmission system 901 is capable of determining the appropriate phases with which to deliver a coherent power transmission signal to the wireless power receiver clients 903a-903n. The array is configured to emit a signal (e.g., continuous wave or pulsed power transmission signal) from multiple antennas at a specific phase relative to each other. It is appreciated that use of the term "array" does not necessarily limit the antenna array to any specific array structure. That is, the antenna array does not need to be structured in a specific "array" form or geometry. Furthermore, as used herein the term "array" or "array system" may include related and peripheral circuitry for signal generation, reception and transmission, such as radios, digital logic and modems. In some embodiments, the wireless power transmission system 901 can have an embedded WiFi hub for data communications via one or more antennas or transceivers.

The wireless devices 902 can include one or more wireless power receiver clients 903. As illustrated in the example of FIG. 9, power delivery antennas 904a-904n are shown. The power delivery antennas 904a are configured to provide delivery of wireless radio frequency power in the wireless power delivery environment. In some embodiments, one or more of the power delivery antennas 904a-904n can alternatively or additionally be configured for data communications in addition to or in lieu of wireless power delivery. The one or more data communication antennas are configured to send data communications to and receive data communications from the wireless power receiver clients 903a-903n and/or the wireless devices 902a-902n. In some embodiments, the data communication antennas can communicate via Bluetooth™, WiFi™, ZigBee™, etc. Other data communication protocols are also possible.

Each wireless power receiver client 903a-903n includes one or more antennas (not shown) for receiving signals from the wireless power transmission systems 901a-901n. Likewise, each wireless power transmission system 901a-901n includes an antenna array having one or more antennas and/or sets of antennas capable of emitting continuous wave or discrete (pulse) signals at specific phases relative to each other. As discussed above, each of the wireless power transmission systems 901a-901n is capable of determining the appropriate phases for delivering the coherent signals to the wireless power receiver clients 902a-902n. For example, in some embodiments, coherent signals can be determined by computing the complex conjugate of a received beacon (or calibration) signal at each antenna of the array such that the coherent signal is phased for delivering power to the particular wireless power receiver client that transmitted the beacon (or calibration) signal.

Although not illustrated, each component of the environment, e.g., wireless device, wireless power transmission system, etc., can include control and synchronization mechanisms, e.g., a data communication synchronization module. The wireless power transmission systems 901a-901n can be connected to a power source such as, for example, a power outlet or source connecting the wireless power transmission systems to a standard or primary AC power supply in a building. Alternatively, or additionally, one or more of the wireless power transmission systems 901a-901n can be powered by a battery or via other mechanisms, e.g., solar cells, etc.

The wireless power receiver clients 902a-902n and/or the wireless power transmission systems 901a-901n are configured to operate in a multipath wireless power delivery environment. That is, the wireless power receiver clients 902a-902n and the wireless power transmission systems 901a-901n are configured to utilize reflective objects 906 such as, for example, walls or other RF reflective obstructions within range to transmit beacon (or calibration) signals and/or to receive wireless power and/or data within the wireless power delivery environment. The reflective objects 906 can be utilized for multi-directional signal communication regardless of whether a blocking object is in the line of sight between the wireless power transmission system and the wireless power receiver clients 903a-903n.

As described herein, each wireless device 902a-902n can be any system and/or device, and/or any combination of devices/systems that can establish a connection with another device, a server and/or other systems within the example environment 900. In some embodiments, the wireless devices 902a-902n include displays or other output functionalities to present data to a user and/or input functionalities to receive data from the user. By way of example, a wireless device 902 can be, but is not limited to, a video game controller, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. By way of example and not limitation, the wireless device 902 can also be any wearable device such as watches, necklaces, rings or even devices embedded on or within the customer. Other examples of a wireless device 902 include, but are not limited to, safety sensors (e.g., fire or carbon monoxide), electric toothbrushes, electronic door lock/handles, electric light switch controller, electric shavers, etc.

Although not illustrated in the example of FIG. 9, the wireless power transmission system 901 and the wireless power receiver clients 903a-903n can each include a data communication module for communication via a data channel. Alternatively, or additionally, the wireless power receiver clients 903a-903n can direct the wireless devices 902a-902n to communicate with the wireless power transmission system via existing data communications modules. In some embodiments, the beacon signal, which is primarily referred to herein as a continuous waveform, can alternatively or additionally take the form of a modulated signal.

Figure 10:
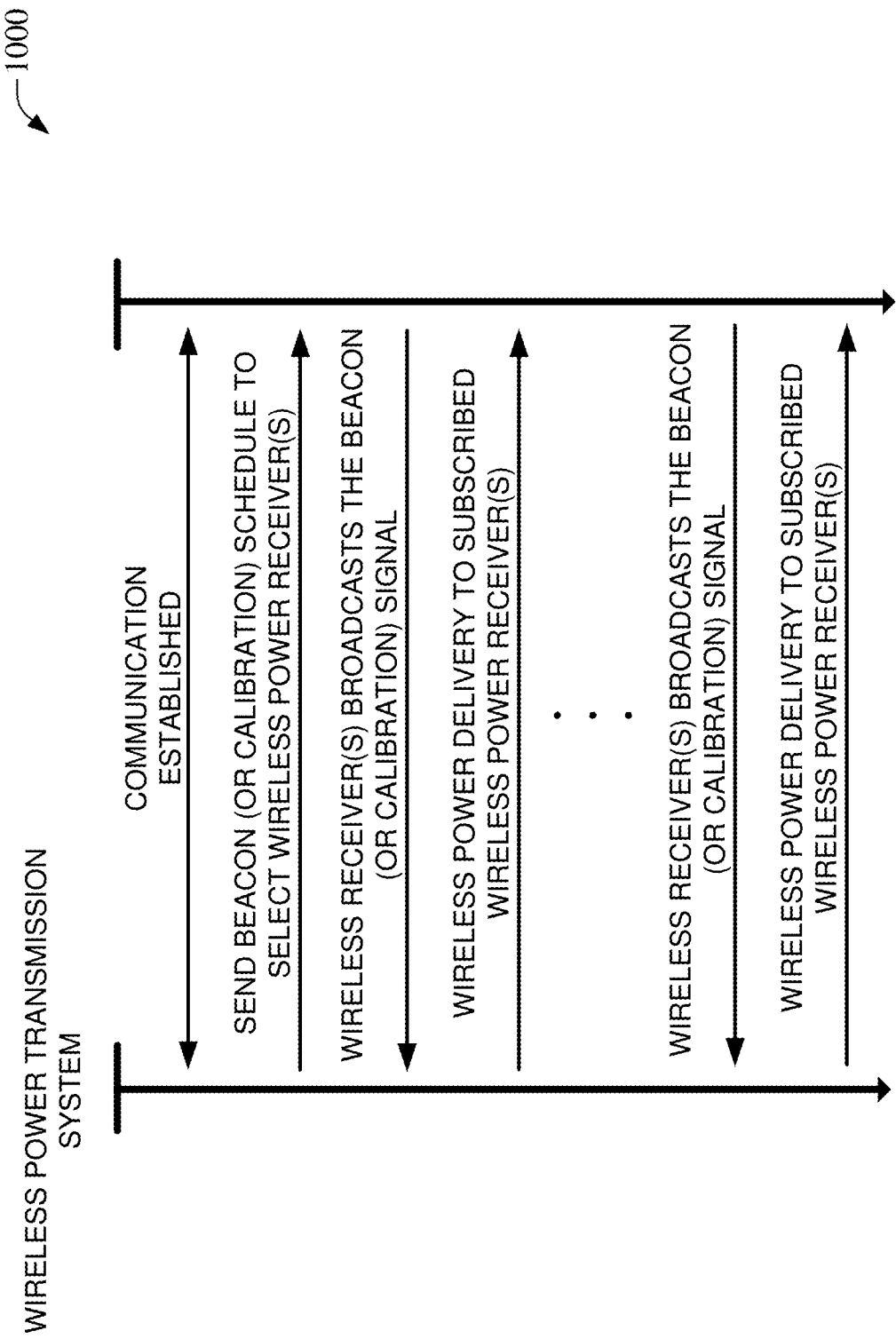
FIG. 10 depicts a sequence diagram illustrating example operations between a wireless power transmission system and a wireless receiver client for commencing wireless power delivery, in accordance with various example embodiments.

FIG. 10 depicts a sequence diagram 1000 illustrating example operations between a wireless power delivery system and a wireless power receiver client 903 for establishing wireless power delivery in a multipath wireless power delivery, according to an embodiment. Initially, communication is established between the wireless power delivery system and the power receiver client. The initial communication can be, for example, a data communication link that is established via one or more antennas (e.g., 904a-904n) of the wireless power transmission system. As discussed, in some embodiments, one or more of the antennas can be data antennas, wireless power transmission antennas, or dual-purpose data/power antennas. Various information can be exchanged between the wireless power transmission system and the wireless power receiver client over this data communication channel. For example, wireless power signaling can be time sliced among various clients in a wireless power delivery environment. In such cases, the wireless power transmission system can send beacon schedule information, e.g., Beacon Beat Schedule (BBS) cycle, power cycle information, etc., so that the wireless power receiver client knows when to transmit (broadcast) its beacon signals and when to listen for power, etc.

Continuing with the example of FIG. 10, the wireless power transmission system selects one or more wireless power receiver clients for receiving power and sends the beacon schedule information to the selected wireless power receiver clients. The wireless power transmission system can also send power transmission scheduling information so that the wireless power receiver client knows when to expect (e.g., a window of time) wireless power from the wireless power transmission system. The wireless power receiver client then generates a beacon (or calibration) signal and broadcasts the beacon during an assigned beacon transmission window (or time slice) indicated by the beacon schedule information, e.g., BBS cycle. As discussed herein, the wireless power receiver client includes one or more antennas (or transceivers) that have a radiation and reception pattern in three-dimensional space proximate to the wireless device in which the wireless power receiver client is embedded.

The wireless power transmission system receives the beacon from the power receiver client and detects and/or otherwise measures the phase (or direction) from which the beacon signal is received at multiple antennas. The wireless power transmission system then delivers wireless power to the power receiver client from the multiple antennas based on the detected or measured phase (or direction) of the received beacon at each of the corresponding antennas. In some embodiments, the wireless power transmission system determines the complex conjugate of the measured phase of the beacon and uses the complex conjugate to determine a transmit phase that configures the antennas for delivering and/or otherwise directing wireless power to the wireless power receiver client via the same path over which the beacon signal was received from the wireless power receiver client.

In some embodiments, the wireless power transmission system includes many antennas. One or more of the many antennas may be used to deliver power to the power receiver client. The wireless power transmission system can detect and/or otherwise determine or measure phases at which the beacon signals are received at each antenna. The large number of antennas may result in different phases of the beacon signal being received at each antenna of the wireless power transmission system. As discussed above, the wireless power transmission system can determine the complex conjugate of the beacon signals received at each antenna. Using the complex conjugates, one or more antennas may emit a signal that takes into account the effects of the large number of antennas in the wireless power transmission system. In other words, the wireless power transmission system can emit a wireless power transmission signal from one or more antennas in such a way as to create an aggregate signal from the one or more of the antennas that approximately recreates the waveform of the beacon in the opposite direction. Said another way, the wireless power transmission system can deliver wireless RF power to the wireless power receiver clients via the same paths over which the beacon signal is received at the wireless power transmission system. These paths can utilize reflective objects 906 within the environment. Additionally, the wireless power transmission signals can be simultaneously transmitted from the wireless power transmission system such that the wireless power transmission signals collectively match the antenna radiation and reception pattern of the client device in a three-dimensional (3D) space proximate to the client device.

As shown, the beacon (or calibration) signals can be periodically transmitted by wireless power receiver clients within the power delivery environment according to, for example, the BBS, so that the wireless power transmission system can maintain knowledge and/or otherwise track the location of the power receiver clients in the wireless power delivery environment. The process of receiving beacon signals from a wireless power receiver client at the wireless power transmission system and, in turn, responding with wireless power directed to that particular wireless power receiver client is referred to herein as retrodirective wireless power delivery.

Furthermore, as discussed herein, wireless power can be delivered in power cycles defined by power schedule information. A more detailed example of the signaling required to commence wireless power delivery is described now with reference to FIG. 11.

Figure 11:
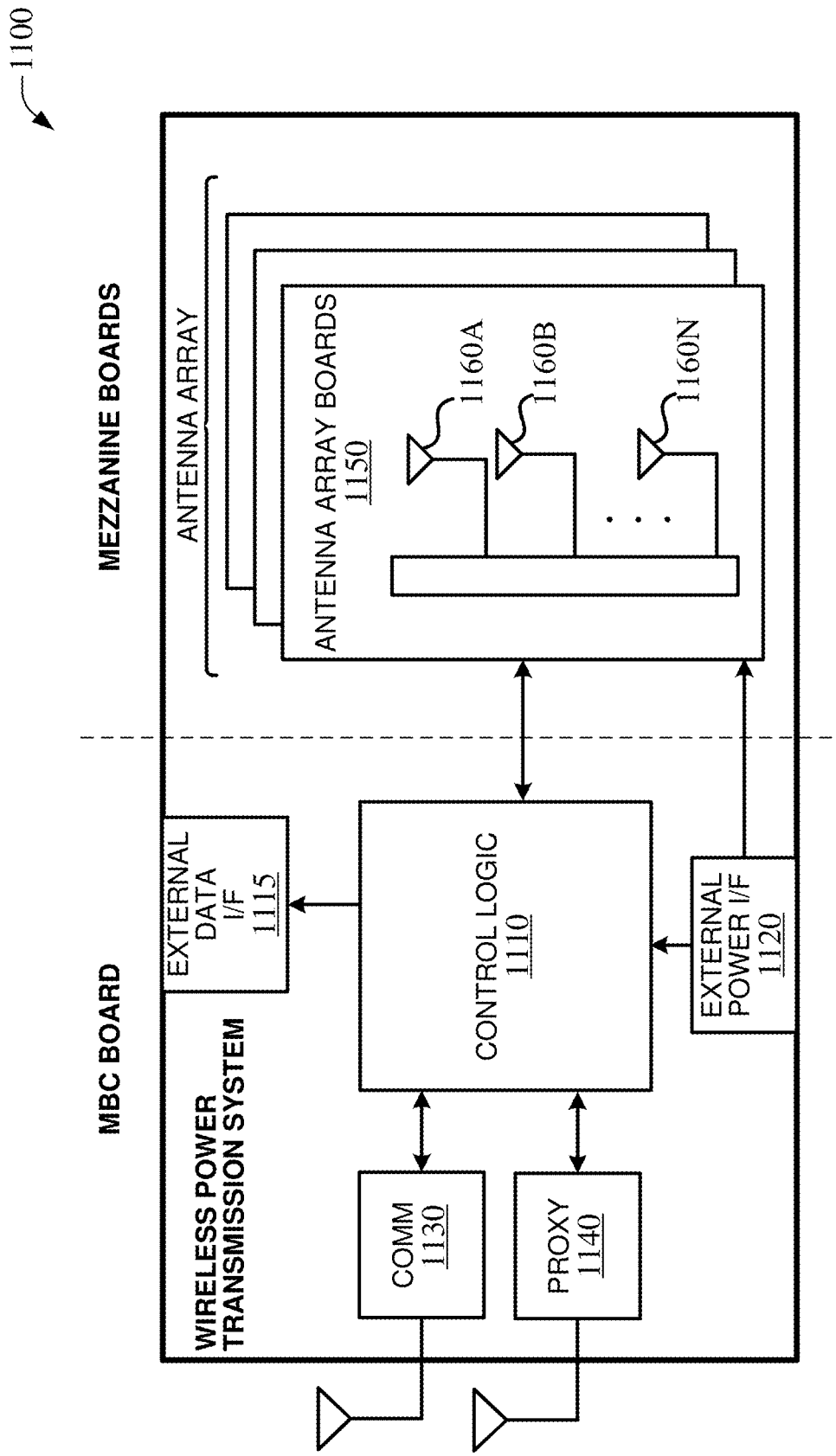
FIG. 11 depicts a block diagram illustrating example components of a wireless power transmission system, in accordance with various example embodiments.

FIG. 11 depicts a block diagram illustrating example components of a wireless power transmission system 1100, in accordance with an embodiment. As illustrated in the example of FIG. 11, the wireless power transmission system 1100 includes a master bus controller (MBC) board and multiple mezzanine boards that collectively comprise the antenna array.

The MBC includes control logic 1110, an external data interface (I/F) 1115, an external power interface (I/F) 1120, a communication block 1130 and proxy 1140. The mezzanine boards (or antenna array boards 1150) each include multiple antennas 1160a-1160n. Some or all of the components can be omitted in some embodiments. Additional components are also possible. For example, in some embodiments only one of communication block 1130 or proxy 1140 may be included.

The control logic 1110 is configured to provide control and intelligence to the array components. The control logic 1110 may comprise one or more processors, FPGAs, memory units, etc., and direct and control the various data and power communications. The communication block 1130 can direct data communications on a data carrier frequency, such as the base signal clock for clock synchronization. The data communications can be Bluetooth™, WiFi™, ZigBee™, etc., including combinations or variations thereof. Likewise, the proxy 1140 can communicate with clients via data communications as discussed herein. The data communications can be, by way of example and not limitation, Bluetooth™, WiFi™, ZigBee™, etc. Other communication protocols are possible.

In some embodiments, the control logic 1110 can also facilitate and/or otherwise enable data aggregation for Internet of Things (IoT) devices. In some embodiments, wireless power receiver clients can access, track and/or otherwise obtain IoT information about the device in which the wireless power receiver client is embedded and provide that IoT information to the wireless power transmission system over a data connection. This IoT information can be provided to via an external data interface 1115 to a central or cloud-based system (not shown) where the data can be aggregated, processed, etc. For example, the central system can process the data to identify various trends across geographies, wireless power transmission systems, environments, devices, etc. In some embodiments, the aggregated data and or the trend data can be used to improve operation of the devices via remote updates, etc. Alternatively, or additionally, in some embodiments, the aggregated data can be provided to third party data consumers. In this manner, the wireless power transmission system acts as a Gateway or Enabler for the IoT devices. By way of example and not limitation, the IoT information can include capabilities of the device in which the wireless power receiver client is embedded, usage information of the device, power levels of the device, information obtained by the device or the wireless power receiver client itself, e.g., via sensors, etc.

The external power interface 1120 is configured to receive external power and provide the power to various components. In some embodiments, the external power interface 1120 may be configured to receive a standard external 24 Volt power supply. In other embodiments, the external power interface can be, for example, 120/240 Volt alternating current (AC) mains to an embedded direct current (DC) power supply that sources the required 12/24/48 Volt DC to provide the power to various components. Alternatively, the external power interface could be a DC supply that sources the required 12/24/48 Volts DC. Alternative configurations are also possible.

In operation, the MBC, which controls the wireless power transmission system, receives power from a power source and is activated. The MBC then activates proxy antenna elements on the wireless power transmission system and the proxy antenna elements enter a default "discovery" mode to identify available wireless receiver clients within range of the wireless power transmission system. When a client is found, the antenna elements on the wireless power transmission system power on, enumerate, and (optionally) calibrate.

The MBC then generates beacon transmission scheduling information and power transmission scheduling information during a scheduling process. The scheduling process includes selection of power receiver clients. For example, the MBC can select power receiver clients for power transmission and generate a BBS cycle and a Power Schedule (PS) for the selected wireless power receiver clients. As discussed herein, the power receiver clients can be selected based on their corresponding properties and/or requirements.

In some embodiments, the MBC can also identify and/or otherwise select available clients that will have their status queried in the Client Query Table (CQT). Clients that are placed in the CQT are those on "standby", e.g., not receiving a charge. The BBS and PS are calculated based on vital information about the clients such as, for example, battery status, current activity/usage, how much longer the client has until it runs out of power, priority in terms of usage, etc.

The Proxy Antenna Element (AE) broadcasts the BBS to all clients. As discussed herein, the BBS indicates when each client should send a beacon. Likewise, the PS indicates when and to which clients the array should send power to and when clients should listen for wireless power. Each client starts broadcasting its beacon and receiving power from the array per the BBS and PS. The Proxy AE can concurrently query the Client Query Table to check the status of other available clients. In some embodiments, a client can only exist in the BBS or the CQT (e.g., waitlist), but not in both. The information collected in the previous step continuously and/or periodically updates the BBS cycle and/or the PS.

Figure 12:
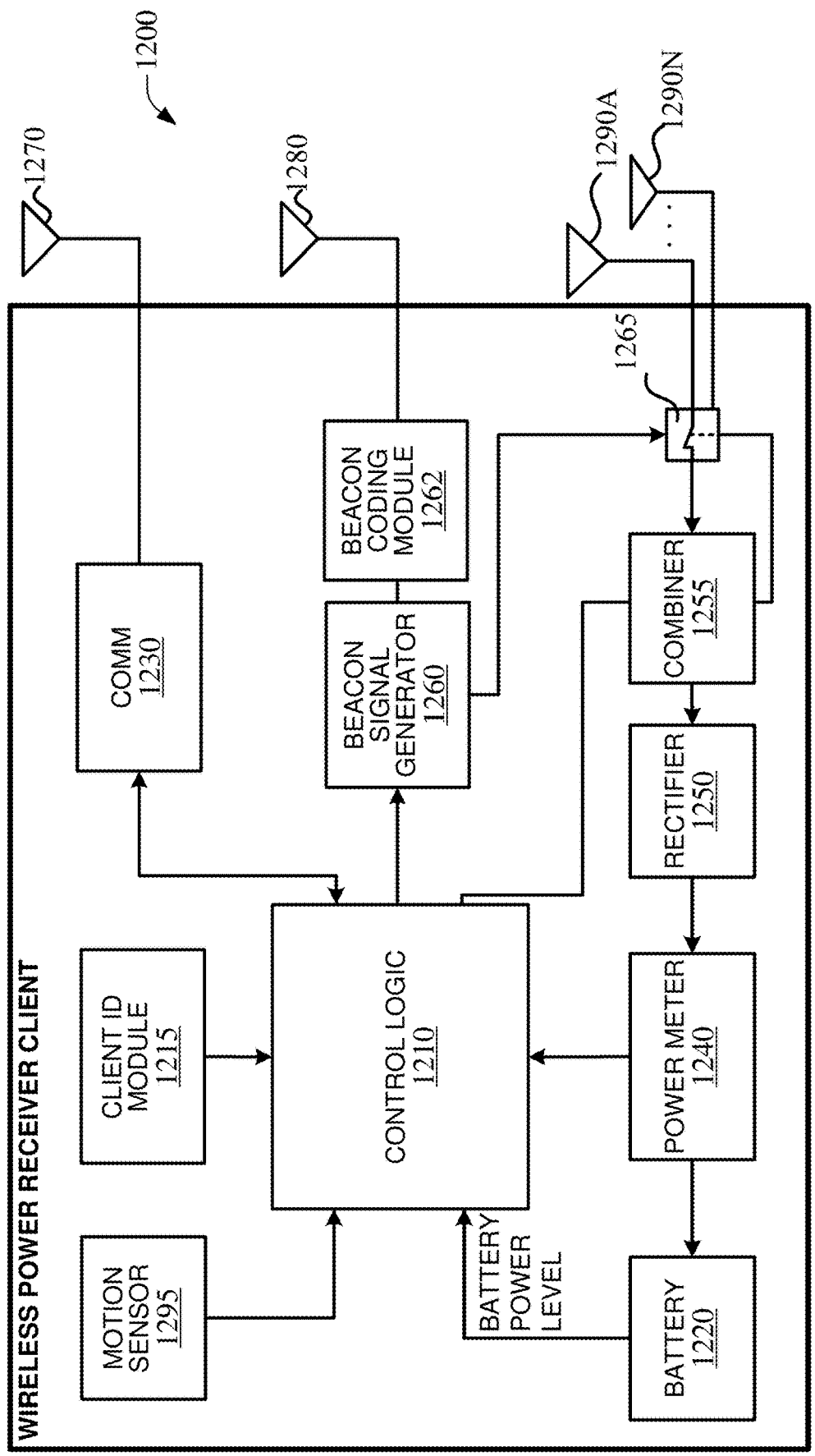
FIG. 12 depicts a block diagram illustrating example components of a wireless power receiver client, in accordance with various example embodiments.

FIG. 12 is a block diagram illustrating example components of a wireless power receiver client 1200, in accordance with some embodiments. As illustrated in the example of FIG. 12, the wireless power receiver client 1200 includes control logic 1210, battery 1220, an IoT control module 1225, communication block 1230 and associated antenna 1270, power meter 1240, rectifier 1250, a combiner 1255, beacon signal generator 1260, beacon coding unit 1262 and an associated antenna 1280, and switch 1265 connecting the rectifier 1250 or the beacon signal generator 1260 to one or more associated antennas 1290a-n. Some or all of the components can be omitted in some embodiments. For example, in some embodiments, the wireless power receiver client 1200 does not include its own antennas but instead utilizes and/or otherwise shares one or more antennas (e.g., WiFi antenna) of the wireless device (e.g., example device 401, etc.) in which the wireless power receiver client is embedded. Moreover, in some embodiments, the wireless power receiver client may include a single antenna that provides data transmission functionality as well as power/data reception functionality. Additional components are also possible.

A combiner 1255 receives and combines the received power transmission signals from the power transmitter in the event that the receiver 1200 has more than one antenna. The combiner can be any combiner or divider circuit that is configured to achieve isolation between the output ports while maintaining a matched condition. For example, the combiner 1255 can be a Wilkinson Power Divider circuit. The rectifier 1250 receives the combined power transmission signal from the combiner 1255, if present, which is fed through the power meter 1240 to the battery 1220 for charging. In other embodiments, each antenna's power path can have its own rectifier 1250 and the DC power out of the rectifiers is combined prior to feeding the power meter 1240. The power meter 1240 can measure the received power signal strength and provides the control logic 1210 with this measurement.

Battery 1220 can include protection circuitry and/or monitoring functions. Additionally, the battery 1220 can include one or more features, including, but not limited to, current limiting, temperature protection, over/under voltage alerts and protection, and coulomb monitoring.

The control logic 1210 receives and processes the battery power level from the battery 1220 itself. The control logic 1210 may also transmit/receive via the communication block 1230 a data signal on a data carrier frequency, such as the base signal clock for clock synchronization. The beacon signal generator 1260 generates the beacon signal, or calibration signal, transmits the beacon signal using either the antenna 1280 or 1290 after the beacon signal is encoded.

It may be noted that, although the battery 1220 is shown as charged by, and providing power to, the wireless power receiver client 1200, the receiver may also receive its power directly from the rectifier 1250. This may be in addition to the rectifier 1250 providing charging current to the battery 1220, or in lieu of providing charging. Also, it may be noted that the use of multiple antennas is one example of implementation and the structure may be reduced to one shared antenna.

In some embodiments, the control logic 1210 and/or the IoT control module 1225 can communicate with and/or otherwise derive IoT information from the device in which the wireless power receiver client 1200 is embedded. Although not shown, in some embodiments, the wireless power receiver client 1200 can have one or more data connections (wired or wireless) with the device in which the wireless power receiver client 1200 is embedded over which IoT information can be obtained. Alternatively, or additionally, IoT information can be determined and/or inferred by the wireless power receiver client 1200, e.g., via one or more sensors. As discussed above, the IoT information can include, but is not limited to, information about the capabilities of the device in which the wireless power receiver client 1200 is embedded, usage information of the device in which the wireless power receiver client 1200 is embedded, power levels of the battery or batteries of the device in which the wireless power receiver client 1200 is embedded, and/or information obtained or inferred by the device in which the wireless power receiver client is embedded or the wireless power receiver client itself, e.g., via sensors, etc.

In some embodiments, a client identifier (ID) module 1215 stores a client ID that can uniquely identify the wireless power receiver client 1200 in a wireless power delivery environment. For example, the ID can be transmitted to one or more wireless power transmission systems when communication is established. In some embodiments, wireless power receiver clients may also be able to receive and identify other wireless power receiver clients in a wireless power delivery environment based on the client ID.

An optional motion sensor 1295 can detect motion and signal the control logic 1210 to act accordingly. For example, a device receiving power may integrate motion detection mechanisms such as accelerometers or equivalent mechanisms to detect motion. Once the device detects that it is in motion, it may be assumed that it is being handled by a user, and would trigger a signal to the array to either to stop transmitting power, or to lower the power transmitted to the device. In some embodiments, when a device is used in a moving environment like a car, train or plane, the power might only be transmitted intermittently or at a reduced level unless the device is critically low on power.

Figure 13A:
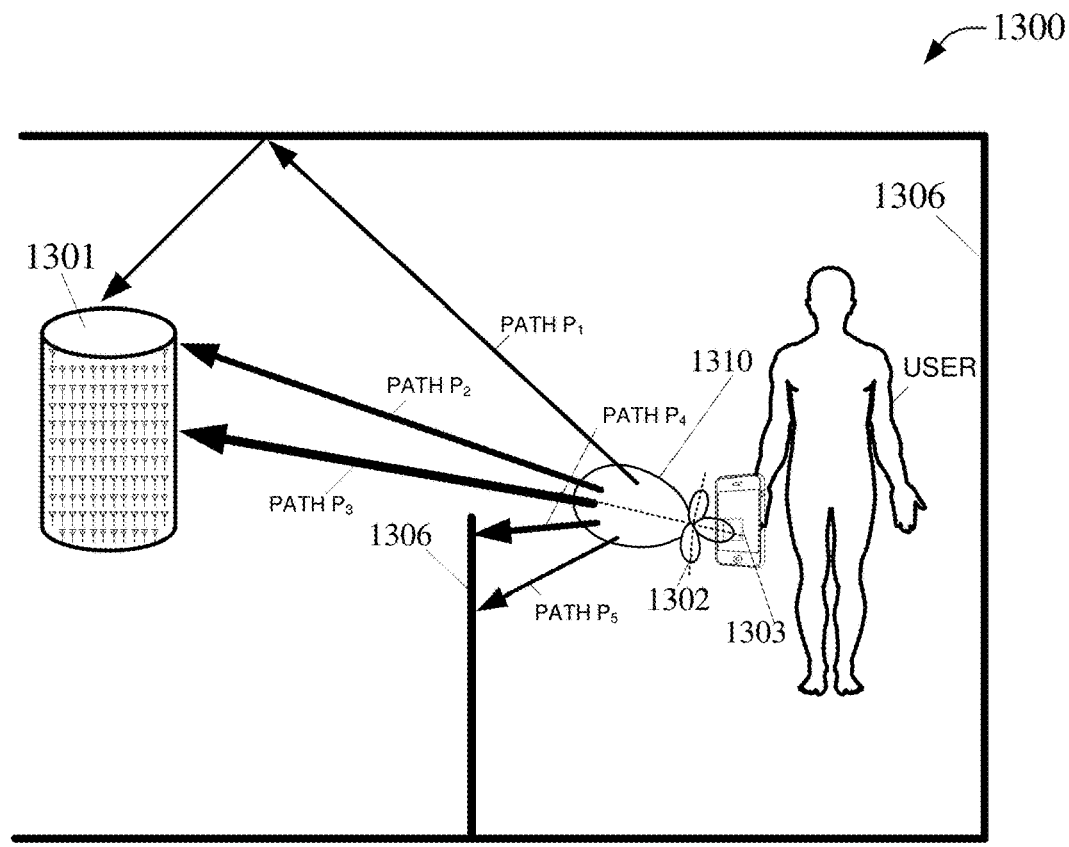
FIGS. 13A and 13B depict block diagrams illustrating example multipath wireless power delivery environments, in accordance with various example embodiments.
Figure 13B:
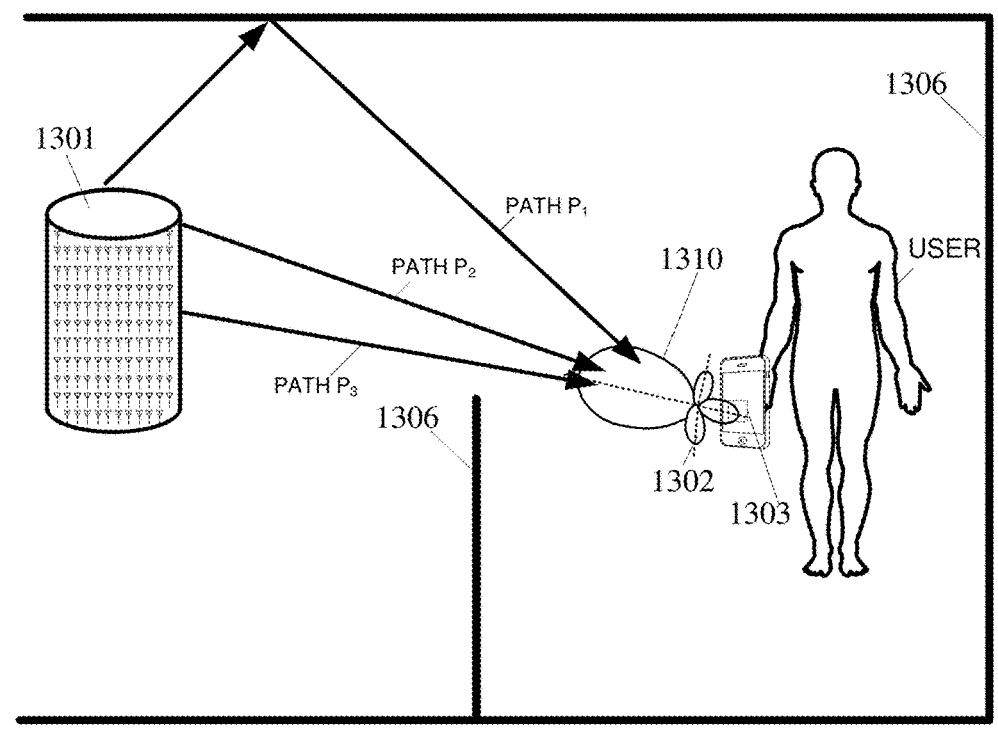

FIGS. 13A and 13B depict diagrams illustrating an example multipath wireless power delivery environment 1300, according to some embodiments. The multipath wireless power delivery environment 1300 includes a user operating a wireless device including one or more wireless power receiver clients (e.g., 1303). The wireless device 1302 can be example device 401, etc.; and the one or more wireless power receiver clients 1303 can be the wireless power receiver client 903 or the wireless power receiver client 1200, although alternative configurations are possible. Likewise, wireless power transmission system 1301 can be wireless power transmission system 901 or wireless power transmission system 1100, although alternative configurations are possible. The multipath wireless power delivery environment 1300 includes reflective objects 1306 and various absorptive objects, e.g., users, or humans, furniture, etc.

Wireless device 1302 includes one or more antennas (or transceivers) that have a radiation and reception pattern 1310 in three-dimensional space proximate to the wireless device 1302. The one or more antennas (or transceivers) can be wholly or partially included as part of the wireless device 1302 and/or the wireless power receiver client (not shown). For example, in some embodiments one or more antennas, e.g., WiFi, Bluetooth, etc. of the wireless device 1302 can be utilized and/or otherwise shared for wireless power reception. As shown in the examples of FIGS. 13A and 13B, the radiation and reception pattern 1310 comprises a lobe pattern with a primary lobe and multiple side lobes. Other patterns are also possible.

The wireless device 1302 transmits a beacon (or calibration) signal over multiple paths to the wireless power transmission system 1301. As discussed herein, the wireless device 1302 transmits the beacon in the direction of the radiation and reception pattern 1310 such that the strength of the received beacon signal by the wireless power transmission system, e.g., received signal strength indication (RSSI), depends on the radiation and reception pattern 1310. For example, beacon signals are not transmitted where there are nulls in the radiation and reception pattern 1310 and beacon signals are the strongest at the peaks in the radiation and reception pattern 1310, e.g., peak of the primary lobe. As shown in the example of FIG. 13A, the wireless device 1302 transmits beacon signals over five paths P1-P5. Paths P4 and P5 are blocked by reflective and/or absorptive object 1306. The wireless power transmission system 1301 receives beacon signals of increasing strengths via paths P1-P3. The bolder lines indicate stronger signals. In some embodiments, the beacon signals are directionally transmitted in this manner, for example, to avoid unnecessary RF energy exposure to the user.

A fundamental property of antennas is that the receiving pattern (sensitivity as a function of direction) of an antenna when used for receiving is identical to the far-field radiation pattern of the antenna when used for transmitting. This is a consequence of the reciprocity theorem in electromagnetism. As shown in the example of FIGS. 13A and 13B, the radiation and reception pattern 1310 is a three-dimensional lobe shape. However, the radiation and reception pattern 1310 can be any number of shapes depending on the type or types, e.g., horn antennas, simple vertical antenna, etc. used in the antenna design. For example, the radiation and reception pattern 1310 can comprise various directive patterns. Any number of different antenna radiation and reception patterns are possible for each of multiple client devices in a wireless power delivery environment.

Referring again to FIG. 13A, the wireless power transmission system 1301 receives the beacon (or calibration) signal via multiple paths P1-P3 at multiple antennas or transceivers. As shown, paths P2 and P3 are direct line of sight paths while path P1 is a non-line of sight path. Once the beacon (or calibration) signal is received by the wireless power transmission system 1301, the power transmission system 1301 processes the beacon (or calibration) signal to determine one or more receive characteristics of the beacon signal at each of the multiple antennas. For example, among other operations, the wireless power transmission system 1301 can measure the phases at which the beacon signal is received at each of the multiple antennas or transceivers.

The wireless power transmission system 1301 processes the one or more receive characteristics of the beacon signal at each of the multiple antennas to determine or measure one or more wireless power transmit characteristics for each of the multiple RF transceivers based on the one or more receive characteristics of the beacon (or calibration) signal as measured at the corresponding antenna or transceiver. By way of example and not limitation, the wireless power transmit characteristics can include phase settings for each antenna or transceiver, transmission power settings, etc.

As discussed herein, the wireless power transmission system 1301 determines the wireless power transmit characteristics such that, once the antennas or transceivers are configured, the multiple antennas or transceivers are operable to transit a wireless power signal that matches the client radiation and reception pattern in the three-dimensional space proximate to the client device. FIG. 13B illustrates the wireless power transmission system 1301 transmitting wireless power via paths P1-P3 to the wireless device 1302. Advantageously, as discussed herein, the wireless power signal matches the client radiation and reception pattern 1310 in the three-dimensional space proximate to the client device. Said another way, the wireless power transmission system will transmit the wireless power signals in the direction in which the wireless power receiver has maximum gain, e.g., will receive the most wireless power. As a result, no signals are sent in directions in which the wireless power receiver cannot receive power, e.g., nulls and blockages. In some embodiments, the wireless power transmission system 1301 measures the RSSI of the received beacon signal and if the beacon is less than a threshold value, the wireless power transmission system will not send wireless power over that path.

The three paths shown in the examples of FIGS. 13A and 13B are illustrated for simplicity, it is appreciated that any number of paths can be utilized for transmitting power to the wireless device 1302 depending on, among other factors, reflective and absorptive objects in the wireless power delivery environment. Although the example of FIG. 13A illustrates transmitting a beacon (or calibration) signal in the direction of the radiation and reception pattern 1310, it is appreciated that, in some embodiments, beacon signals can alternatively or additionally be omni-directionally transmitted.

Figure 14:
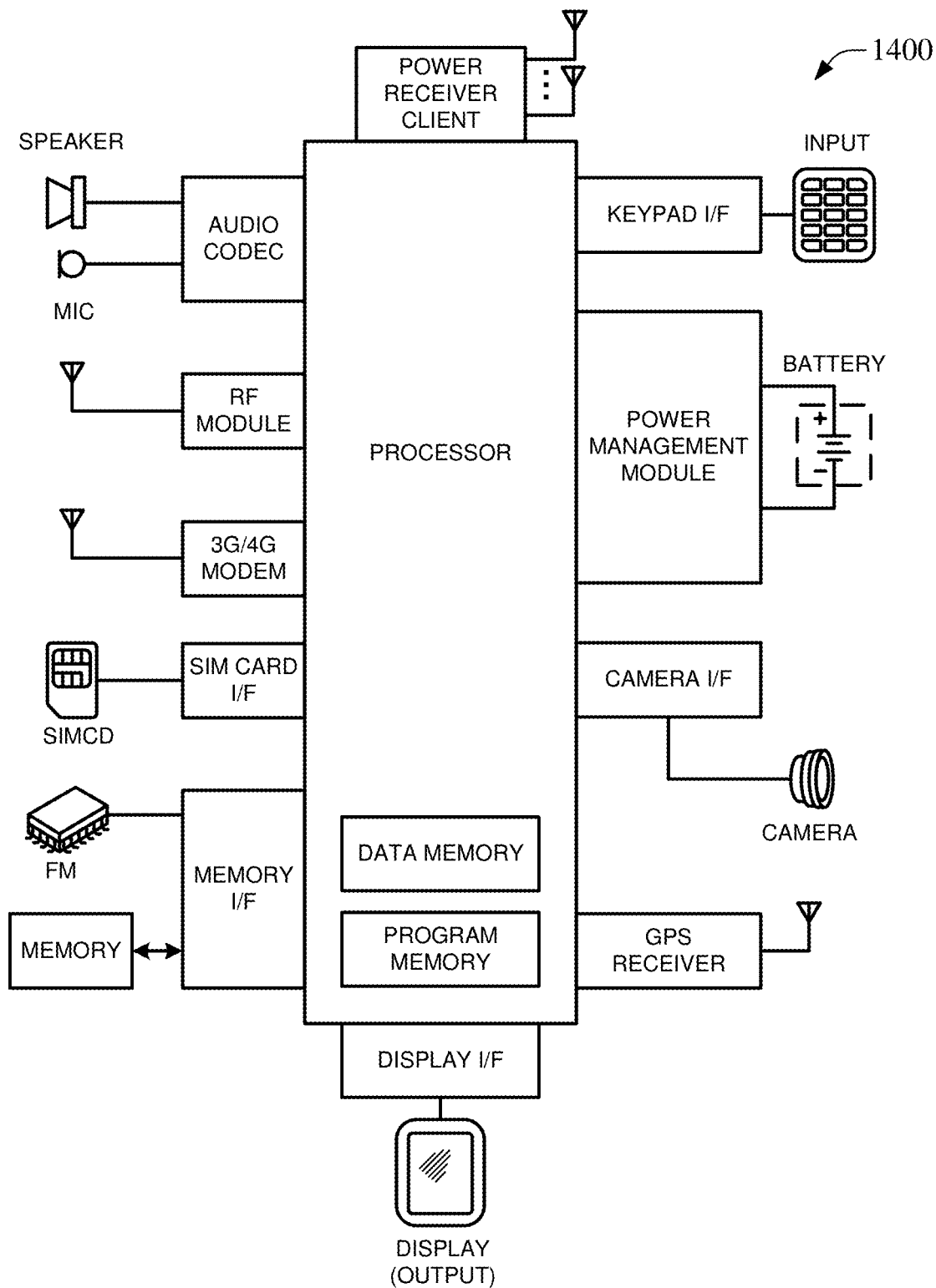
FIG. 14 depicts a block diagram illustrating example components of a representative mobile device or tablet computer with a wireless power receiver or client in the form of a mobile (or smart) phone or tablet computer device, in accordance with various example embodiments.

FIG. 14 depicts a block diagram illustrating example components of a representative mobile device (e.g., 401) or tablet computer 1400 with a wireless power receiver or client in the form of a mobile (or smart) phone or tablet computer device, according to an embodiment. Various interfaces and modules are shown with reference to FIG. 14, however, the mobile device or tablet computer does not require all of modules or functions for performing the functionality described herein. It is appreciated that, in many embodiments, various components are not included and/or necessary for operation of the category controller. For example, components such as GPS radios, cellular radios, and accelerometers may not be included in the controllers to reduce costs and/or complexity. Additionally, components such as ZigBee radios and RF identification (RFID) transceivers, along with antennas, can populate a PCB.

The wireless power receiver client can be a power receiver client 903 of FIG. 9, although alternative configurations are possible. Additionally, the wireless power receiver client can include one or more RF antennas for reception of power and/or data signals from a charger, e.g., WPTS 901 of FIG. 1.

Figure 15:
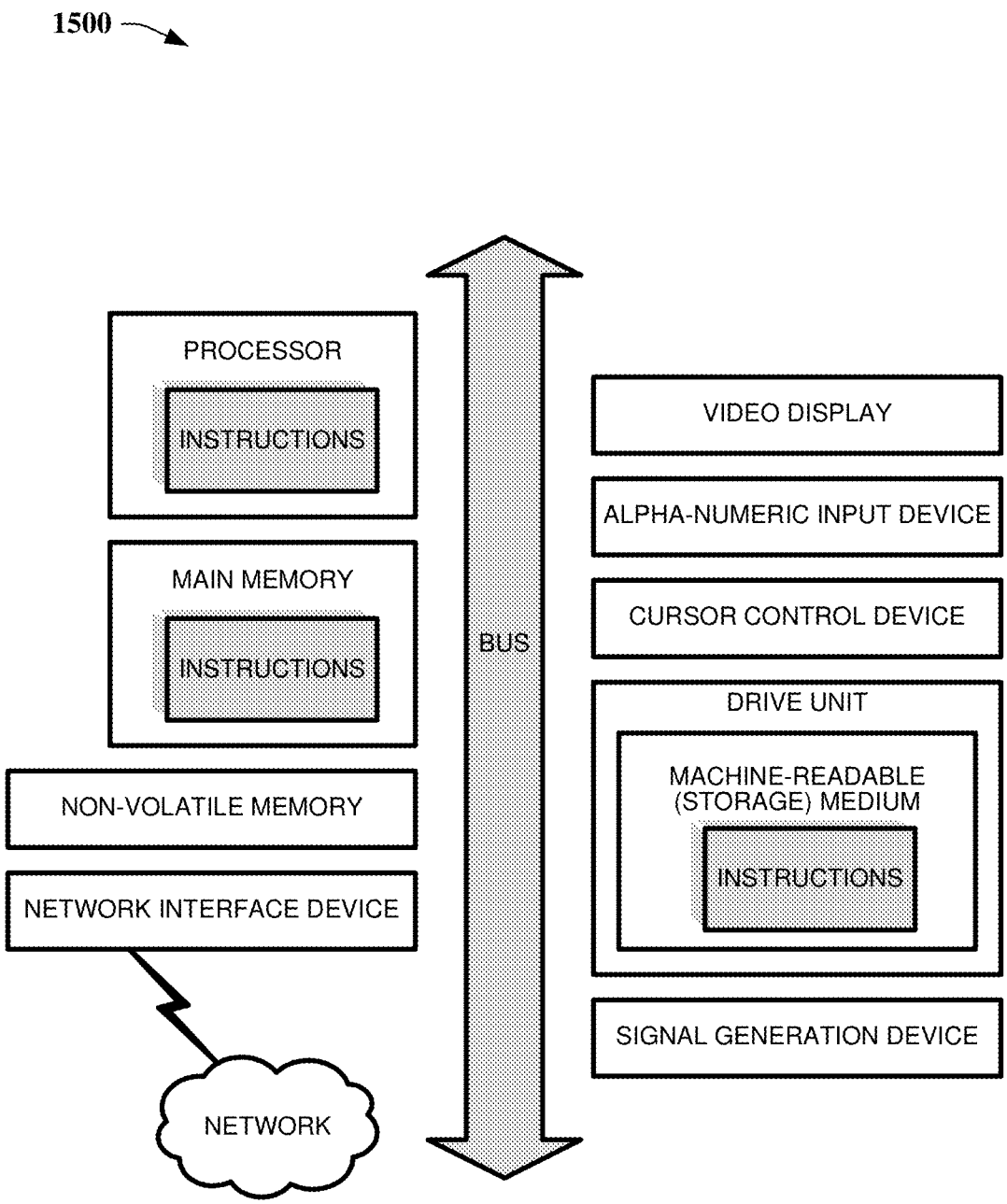
FIG. 15 depicts a diagrammatic representation of a machine, in an example form, of a computer system within which a set of instructions, for causing the machine to perform any one or more of the methodologies discussed herein, may be executed, in accordance with various example embodiments.

FIG. 15 depicts a diagrammatic representation of a machine, in the example form, of a computer system within which a set of instructions, for causing the machine to perform any one or more of the methodologies discussed herein, may be executed.

In the example of FIG. 15, the computer system includes a processor, memory, non-volatile memory, and an interface device. Various common components (e.g., cache memory) are omitted for illustrative simplicity. The computer system 1500 is intended to illustrate a hardware device on which any of the components depicted in the example of FIG. 9 (and any other components described in this specification) can be implemented. For example, the computer system can be any radiating object or antenna array system. The computer system can be of any applicable known or convenient type. The components of the computer system can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a compact disk ROM (CD-ROM), electrically programmable ROM (EPROM), or electrically erasable ROM (EEPROM), a magnetic or optical card, or another form of storage for large amounts of data. Some of this data is often written, by a direct memory access process, into memory during execution of software in the computer 1500. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, an integrated services digital network (ISDN) modem, cable modem, token ring interface, satellite transmission interface (e.g. "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 15 reside in the interface.

In operation, the computer system 1500 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. Additionally, a processing component can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. A processing component can exploit nano-scale architectures such as, but not limited to, molecular and quantum-dot based transistors, switches and gates, in order to optimize space usage or enhance performance of components described herein. Further, a processing component can also be implemented as a combination of computing processing units.

In the subject specification, term "memory component" and substantially any other information storage component relevant to operation and functionality of a component and/or process described herein, refer to entities embodied in a "memory," or components comprising the memory. It will be appreciated that a memory component described herein can be either volatile memory or nonvolatile memory, or can include both volatile and nonvolatile memory.

By way of illustration, and not limitation, nonvolatile memory, for example, can be included in ROM, programmable ROM (PROM), EPROM, EPROM, or flash memory. Volatile memory can include RAM, which acts as external cache memory. By way of illustration and not limitation, RAM is available in many forms such as SRAM, DRAM, synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is typically intended to mean an inclusive "or" rather than an exclusive "or." That is, unless specified otherwise, or clear from context, "X employs A or B" is intended to mean any of the natural inclusive permutations. That is, if X employs A alone, X employs B alone, X employs C alone, X employs A and B alone, X employs B and C alone, X employs A and C alone, or X employs A and B and C, then "X employs A, B or C" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A but not aspect B, and a second embodiment that has aspect B but not aspect A, does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

Further, the term "include," "has," "contains," or other similar terms, are intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows. Data or signal information exchange can comprise technology, such as, single user (SU) multiple-input and multiple-output (MIMO) (SU MIMO) radio(s), multiple user (MU) MIMO (MU MIMO) radio(s), long-term evolution (LTE), LTE time-division duplexing (TDD), global system for mobile communications (GSM), GSM EDGE Radio Access Network (GERAN), Wi Fi, WLAN, WiMax, CDMA2000, LTE new radio-access technology (LTE-NX), massive MIMO systems, etc.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As used herein, the terms "connected," "coupled," or any variant thereof, means any connection or coupling, either direct or indirect, between two or more elements; the coupling of connection between the elements can be physical, logical, or a combination thereof. Where context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Furthermore embodiments can be combined, elements of embodiments can be excluded, etc. In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A wireless power receiver device, comprising:
   a processor; and
   a memory that stores executable instructions that, when executed by the processor, facilitates performance of operations, comprising:
   receiving sleep information related to changing a first state of the wireless power receiver device;
   determining a modification to the first state of the wireless power receiver device based on the sleep information; and
   adapting the first state of the wireless power receiver device based on the modification, resulting in a second state of the wireless power receiver device, wherein the adapting the first state occurs prior to an authentication of the device to a wireless power transmission system.

2. The wireless power receiver device of claim 1, wherein the sleep information comprises a time value.

3. The wireless power receiver device of claim 1, wherein the sleep information comprises a modification instruction, the modification instruction facilitating the determining the modification to the first state of the device.

4. The wireless power receiver device of claim 1, wherein the second state is a state that consumes less power than the first state.

5. The wireless power receiver device of claim 1, wherein the wireless power receiver device receives wirelessly transmitted power at a first level prior to the adapting the first state, and wherein the first level is determined to be germane to the wireless power receiving device prior to an authentication to the wireless power transmission system.

6. The wireless power receiver device of claim 1, wherein the modification is a first modification, and wherein operations further comprise:
   determining a second modification to the second state of the wireless power receiver device based on the sleep information; and
   adapting the second state of the wireless power receiver device based on the second modification, resulting in a third state of the wireless power receiver device.

7. The wireless power receiver device of claim 6, wherein the third state is a state that consumes more power than the second state.

8. The wireless power receiver device of claim 6, wherein the wireless power receiver device receives wirelessly transmitted power at a first level before the adapting the second state, and wherein the first level is determined to be germane to the wireless power receiving device prior to an authentication to the wireless power transmission system.

9. The wireless power receiver device of claim 8, wherein the first level of the wirelessly transmitted power is a courtesy-level of wirelessly transmitted power.

10. The device of claim 9, wherein the wireless power receiver device receives wirelessly transmitted power at a second level after the adapting the second state, wherein the second level is different than the first level.

11. The device of claim 10, wherein the second level of the wirelessly transmitted power is an authenticated-level of wirelessly transmitted power that is determined to be safe to be received by the device subsequent to an authentication of the device to a wireless power transmission system device of the wireless power transmission system.

12. A method, comprising:
   receiving, by a wireless power transmission receiving device comprising a processor and a memory, delay information related to changing a first state of the wireless power transmission receiving device;
   determining, by the wireless power transmission receiving device, a transition from a first state of the wireless power transmission receiving device to a second state of the wireless power transmission receiving device based on the delay information; and
   in response to the determining the transition, initiating, by the wireless power transmission receiving device during an authentication of the wireless power transmission receiving device to a wireless power transmission system, the transition from the first state of the wireless power transmission receiving device to the second state of the wireless power transmission receiving device.

13. The method of claim 12, wherein the receiving the delay information comprises receiving a time value corresponding to a determined authentication time related to authenticating the wireless power transmission receiving device to a wireless power transmission system device.

14. The method of claim 12, wherein the second state causes a user equipment comprising the wireless power transmission receiving device to consume less power than when the wireless power transmission receiving device is in the first state.

15. The method of claim 12, wherein the transition is a first transition, and wherein operations further comprise:
 determining, by the wireless power transmission receiving device, a second transition from the second state of the wireless power transmission receiving device to a third state of the wireless power transmission receiving device based on the delay information; and
 in response to the determining the second transition, initiating, by the wireless power transmission receiving device, the second transition from the second state of the wireless power transmission receiving device to the third state of the wireless power transmission receiving device.

16. The method of claim 15, wherein the wireless power transmission receiving device receives wirelessly transmitted power at a first level before the second transition and at a second level after the second transition, wherein the first level is different from the second level, and wherein the second level corresponds to a level of power determined to be applicable to reception of power by an authenticated wireless power transmission receiving device.

17. A machine-readable storage medium, comprising executable instructions that, when executed by a processor of a wireless power transmission receiving device, facilitate performance of operations, comprising:
 receiving information related to changing a first state of the wireless power transmission receiving device;
 based on the information, determining a first transition from a first state of the wireless power transmission receiving device to a second state of the wireless power transmission receiving device;
 initiating the first transition from the first state of the wireless power transmission receiving device to the second state of the wireless power transmission receiving device, wherein the initiating the first transition occurs during an authentication period corresponding to authenticating the wireless power receiving device to a wireless power transmission system;
 enabling reception of first wirelessly transmitted power at a first level corresponding to first a level of power determined for an unauthenticated wireless power transmission receiving device;
 based on the information, determining a second transition from the second state of the wireless power transmission receiving device to a third state of the wireless power transmission receiving device;
 initiating the second transition from the second state of the wireless power transmission receiving device to the third state of the wireless power transmission receiving device; and
 enabling reception of second wirelessly transmitted power at a second level corresponding to a second level of power determined for an authenticated wireless power transmission receiving device.

18. The machine-readable storage medium of claim 17, wherein the information comprises temporal information corresponding to an estimated time to authenticate the wireless power transmission receiving device to a wireless power transmission device.

19. The machine-readable storage medium of claim 18, wherein the time to authenticate is based on a time to authenticate a subscription corresponding to the wireless power transmission receiving device being authorized to receive the second level of power.

20. The machine-readable storage medium of claim 18, wherein the time to authenticate is based on a time to authenticate a type of the wireless power transmission receiving device as a validated type to receive the second level of power.

* * * * *